United States Patent
West et al.

(10) Patent No.: US 9,766,713 B2
(45) Date of Patent: Sep. 19, 2017

(54) SYSTEM AND METHOD FOR PROVIDING USER INTERFACE TOOLS

(71) Applicant: Unity IPR ApS, Copenhagen K (DK)

(72) Inventors: Timoni West, San Francisco, CA (US); Amir Pascal Ebrahimi, Mill Valley, CA (US)

(73) Assignee: Unity IPR ApS, Copenhagen K (DK)

( * ) Notice: Subject to any disclaimer, the term of this patent is extended or adjusted under 35 U.S.C. 154(b) by 0 days.

(21) Appl. No.: 15/259,952

(22) Filed: Sep. 8, 2016

(65) Prior Publication Data

US 2017/0068323 A1 Mar. 9, 2017

Related U.S. Application Data

(60) Provisional application No. 62/215,577, filed on Sep. 8, 2015.

(51) Int. Cl.
| | |
|---|---|
| *G06F 3/0481* | (2013.01) |
| *G06F 3/01* | (2006.01) |
| *G06T 7/00* | (2017.01) |
| *G06K 9/00* | (2006.01) |
| *G06F 3/0485* | (2013.01) |
| *G02B 27/01* | (2006.01) |
| *G06T 19/00* | (2011.01) |

(52) U.S. Cl.
CPC ............ *G06F 3/017* (2013.01); *G02B 27/01* (2013.01); *G06F 3/011* (2013.01); *G06F 3/0485* (2013.01); *G06F 3/04815* (2013.01); *G06K 9/00355* (2013.01); *G06T 7/0046* (2013.01); *G06T 19/00* (2013.01); *G06T 2207/30196* (2013.01)

(58) Field of Classification Search
CPC ...... G06F 3/017; G06F 3/011; G06F 3/04815; G06K 9/00355; G06T 7/0046; G06T 19/006
See application file for complete search history.

(56) References Cited

U.S. PATENT DOCUMENTS

| 9,530,326 B1 | 12/2016 | Ramloll | |
|---|---|---|---|
| 2004/0113885 A1* | 6/2004 | Genc | G06F 3/011 345/156 |
| 2005/0285878 A1* | 12/2005 | Singh | H04M 1/72544 345/633 |

(Continued)

*Primary Examiner* — Anil Bhargava
(74) *Attorney, Agent, or Firm* — Schwegman Lundberg & Woessner, P.A.

(57) ABSTRACT

A system includes one or more hardware processors, a head mounted display configured to display a virtual environment to a user, an input device, and a virtual mini-board module. The mini-board module is configured to render the virtual environment for presentation to the user via the HMD, the virtual environment is rendered from a first perspective providing a field of view of the virtual environment to the user, provide a virtual mini-board to the user within the field of view, the virtual mini-board displaying a region of the virtual environment, detect an interaction event performed by the user on the virtual mini-board, identify the first object based on the interaction event performed on the virtual mini-board, and perform the interaction event on the first object within the virtual environment based on the interaction event performed on the virtual mini-board.

20 Claims, 15 Drawing Sheets
(3 of 15 Drawing Sheet(s) Filed in Color)

(56) References Cited

U.S. PATENT DOCUMENTS

| | | | |
|---|---|---|---|
| 2012/0249416 A1* | 10/2012 | Maciocci | G06F 3/011 345/156 |
| 2013/0198663 A1* | 8/2013 | Matas | G06T 11/60 715/765 |
| 2013/0335405 A1* | 12/2013 | Scavezze | G06T 19/20 345/419 |
| 2013/0342564 A1* | 12/2013 | Kinnebrew | G09G 3/003 345/619 |

\* cited by examiner

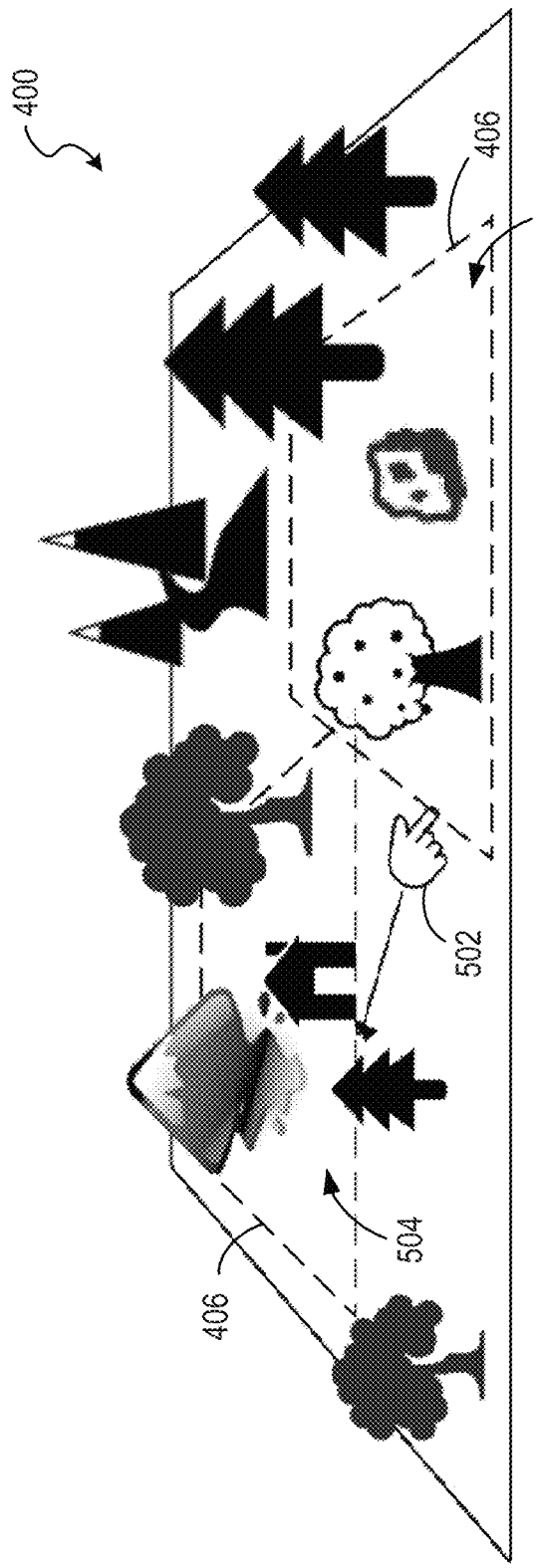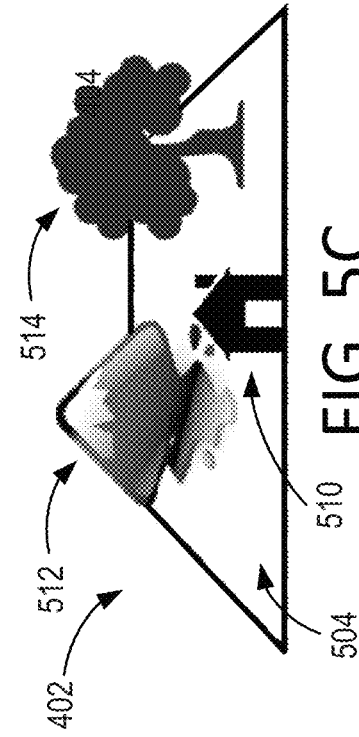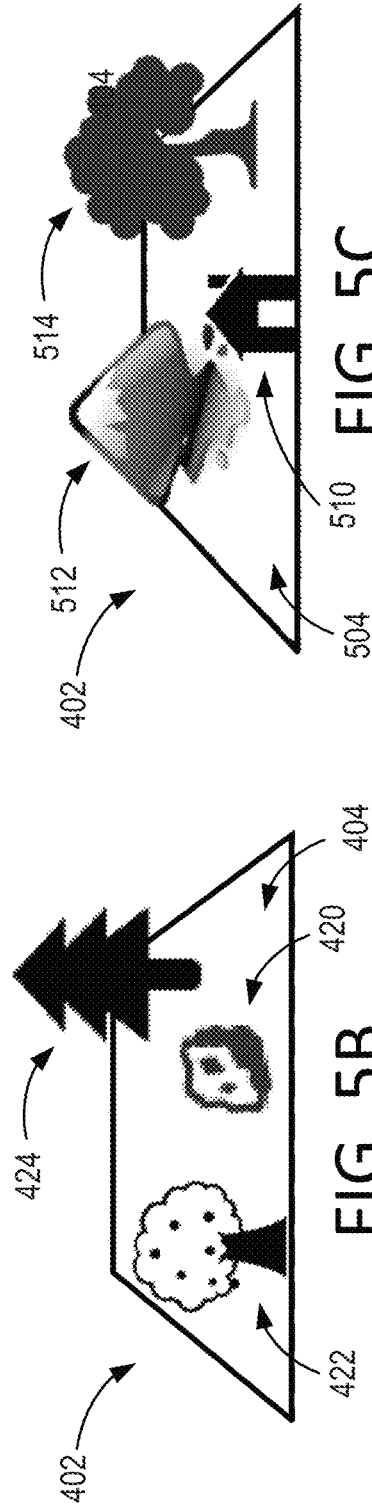
FIG. 5A
FIG. 5B
FIG. 5C

SYSTEM AND METHOD FOR PROVIDING USER INTERFACE TOOLS

RELATED APPLICATIONS

This application claims the benefit of priority to U.S. Provisional Patent Application Ser. No. 62/215,577, filed Sep. 8, 2015, herein incorporated by reference in its entirety.

TECHNICAL FIELD

The subject matter disclosed herein generally relates to the technical field of special-purpose machines that facilitate user interfaces, including software-configured computerized variants of such special-purpose machines and improvements to such variants, and to the technologies by which such special-purpose machines become improved compared to other special-purpose machines that facilitate user interfaces. Specifically, the present disclosure addresses systems and methods to facilitate software tools for use in creating and manipulating 3-dimensional (3D) virtual objects within a virtual environment.

BACKGROUND

The technology in and around virtual reality (VR) and augmented reality (AR) is growing and maturing quickly. The proliferation of head mounted displays (HMDs) and hand tracking and input devices have given users (e.g., game players) new ways to experience virtual environments. However, there is still much work to do on user friendly tools to be used within the virtual environment.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various ones of the appended drawings merely illustrate example embodiments of the present disclosure and cannot be considered as limiting its scope, and in which:

FIG. 5A illustrates the virtual environment with both the first region and the second region outlined with the border;

FIG. 5B illustrates the mini-board when the focus is on the first region (e.g., before the move);

FIG. 5C illustrates the mini-board when the focus is on the second region (e.g., after the move);

The headings provided herein are merely for convenience and do not necessarily affect the scope or meaning of the terms used. Like numbers in the Figures indicate like components.

Figure 1:
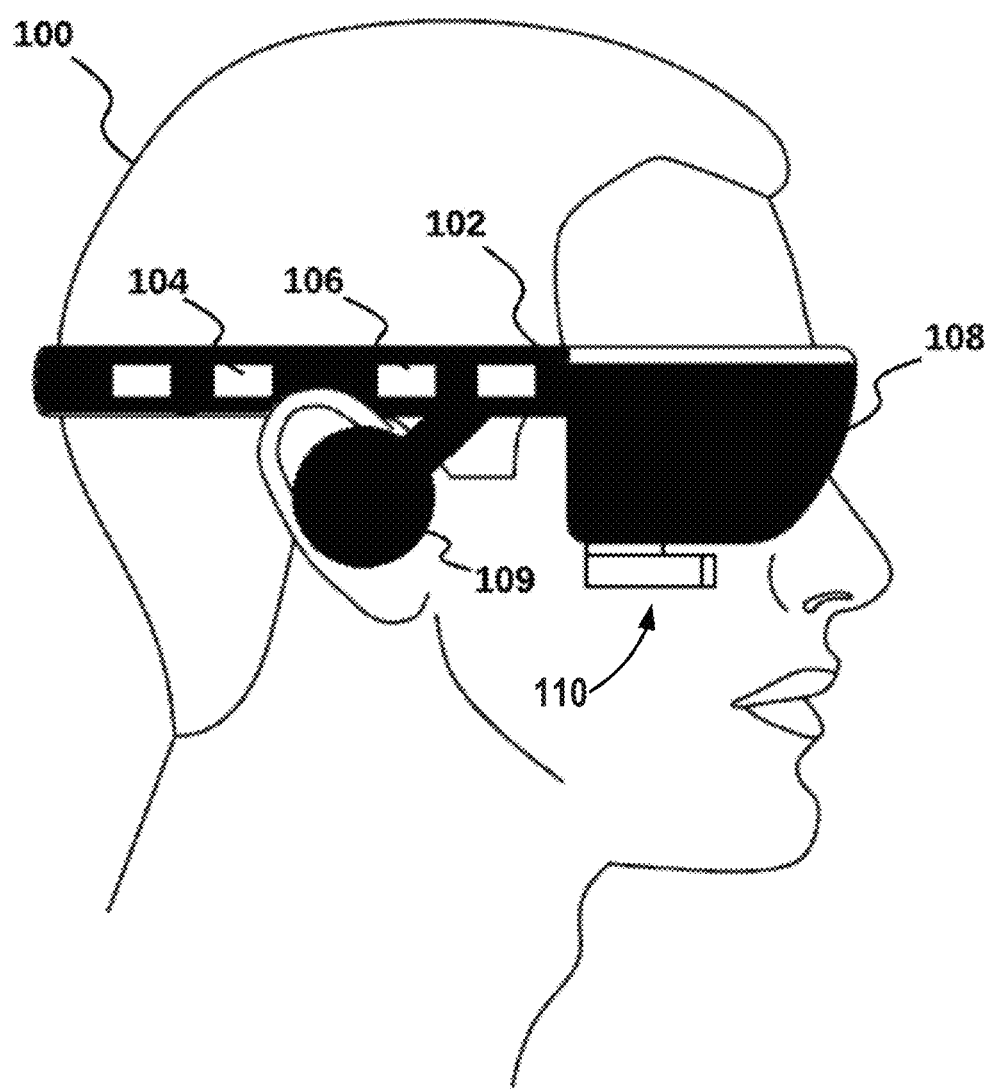
FIG. 1 is a diagram of an example HMD worn by a user.

In the description below, the term "module" refers broadly to software, hardware, or firmware (or any combination thereof) components. Modules are typically functional components that can generate useful data or other output using specified input(s). A module may or may not be self-contained. An application program (also called an "application") may include one or more modules, or a module can include one or more application programs.

DETAILED DESCRIPTION

The description that follows describes systems, methods, techniques, instruction sequences, and computing machine program products that constitute illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details.

Current technology is still searching for new ways to efficiently create and edit virtual environments (e.g., easily move the developer around large virtual spaces in order to easily edit large-scale objects without much movement on the developer's part). This problem is exacerbated for VR environments, in which the developer may operate within the virtual world, or may be subject to certain motion mechanics or perspective and orientation issues while within the VR environment. Some users of VR may not have a large real world space to move in. They may be stuck at their desk sitting on a chair, or may be in a room with limited space for maneuverability. On the other hand, the VR environment in which they move can be substantially larger, leading to the need for tools that can easily produce large scale movement or editing operations in the VR environment using limited movements of the developer in real space. Simply put, the VR environment and real world space rarely match up, leading to awkward movements that must be performed by the user with the current technology. Even when the user is stationary, they may have to make large gestures to move large scale objects (e.g., when creating worlds), which may be cumbersome, impractical, or dangerous. Further, for many users (e.g., developers, artists, creators), it may be helpful to work with objects at scale while at the same time having a miniaturized view. The user may benefit from an ability to see and interact with both views at the same time. For example, this may be beneficial when an artist is creating scenes for movies/games and they wish to see a screen sized view of a scene while at the same time having a zoomed in view of one section of the screen.

The systems and methods described herein provides solutions to many of these challenges, allowing a user to, for example, both preview their work at full size, and also to easily move around it while being within a contained real world space. A virtual mini-board system and methods are provided herein. The virtual mini-board system may be a VR-based virtual environment editor (e.g., a game development engine), or a component thereof. For example, the developer may be wearing an HMD and operating hand-held tracking input device(s) while editing, via VR, a gaming environment under development. In this example development setting, the user may move or perform editing operations within the full virtual environment (e.g., placing or editing virtual objects).

In an example embodiment, while the user navigates and operates within the full virtual environment, the virtual mini-board system provides a small virtual mini-board (or just "mini-board", e.g., 2 by 2 feet) that is visible to the user while experiencing in virtual environment. The mini-board acts as a workspace that can be used to manipulate the virtual environment. The mini-board displays a miniaturized view of an area within the virtual environment (e.g., an area surrounding the user's avatar), along with some or all of the virtual objects currently present in the virtual environment. The mini-board hovers near the user as the user moves around the virtual environment and provides interaction mechanics functionality for the user through the mini-board ("mini-board interaction operations"). The board hovers, in the VR environment, within arm's reach of the user (e.g., as the user moves, rotates) such that the user can easily view and interact with it. The distance between the virtual mini board and the user, as well as the actual size and shape of the board, may be adjustable. These mini-board interaction operations allow the user to more easily interact with virtual objects present in the full virtual environment, as an alternative to, or in addition to, operations otherwise accessible within the full virtual environment (e.g., movement of the user's avatar, virtual object creation, deletion, manipulation, changing object properties). Some of the mini-board interaction operations may cause changes to the full virtual environment, objects within the virtual environment, or other visible changes. The mini-board may be moved or resized within the virtual environment, and may change perspective or scale, allowing the user to interact with objects in the virtual environment from the mini-board.

The virtual mini-board system combines aspects of mapping, model creation, and the utility of a controller all into one tool, enabling the user to exponentiate their efforts through the viewing and editing functionalities provided to the user through the mini-board. The arm's length interaction makes it advantageous for developers working within the VR environment, always having this tool within easy reach.

Some of the example embodiments and associated figures provided herein may depict an environment presented to and experienced by the user (e.g., via 2D, 3D, VR, or AR), as well as a smaller representation of that environment (e.g., on the mini-board). As used herein, the terms "virtual environment" and "full virtual environment" are used, synonymously, to refer to the overall environment presented to the user. The term "mini-board environment" is used herein, as needed, to distinguish between the full virtual environment and what appears on the mini-board. Alternately, changes affecting the mini-board environment may simply be referred to as happening "on the mini-board," for convenience.

FIG. 1 is a diagram of an example HMD 102 worn by a user 100. In the example embodiment, the user 100 (e.g., a game developer or game player) experiences a virtual environment (e.g., via VR) or an augmented reality (AR) content while wearing the HMD 102. The HMD 102 includes a visor 108 having two display devices (e.g., one for each eye), a central processing unit (CPU) 104, a graphical processing unit (GPU) 106, and earphone speakers 109. The display device(s) may include one or more opaque display surfaces (e.g., providing AR content, or a complete visual experience for the user 100), or the display device(s) may include one or more semi-opaque or clear display surfaces (e.g., providing AR content to the user 100). In some embodiments, the visor 108 may include a single display device (e.g., split for both eyes). The HMD 102 also includes one or more camera devices 110 configured to capture real-world digital video around the user 100 (e.g., a field of view, a peripheral view, or a 360° view around the wearer 100). The camera devices 110 may be used to capture the real world environment around the user 100, thereby allowing the HMD 102 to provide that content as a part of a VR environment (e.g., a mixed AR/VR environment) displayed to the user 100. In some embodiments, the HMD 102 may be similar to virtual reality HMDs such as the Oculus Rift®, The HTC Vive®, The Playstation VR®, and the like.

In some embodiments, the user 100 also holds a pair of handheld tracking devices ("handhelds") (not shown), one in each hand. The handhelds provide information about the absolute or relative position and orientation of a user's hands and, as such, are capable of capturing hand gesture information. The handhelds may be configured to operate directly with the HMD 102 (e.g., via wired or wireless communication). In some embodiments, the handhelds may be Oculus Touch® hand controllers, HTC Vive® hand trackers, or Playstation VR® hand controllers. The handhelds may also include one or more buttons or joysticks built into the handheld.

In other embodiments, the user 100 may wear one or more wearable hand tracking devices (e.g., motion tracking gloves, not shown), such as those made commercially available by Manus VR (Netherlands). In still other embodiments, hand motion of the user 100 may be tracked without, or in addition to, the handhelds or wearable hand tracking devices via a hand position sensor (not shown, e.g., using optical methods to track the position and orientation of the user's hands) such as, for example, those made commercially available by Leap Motion, Inc. (a California corporation). Such hand tracking devices (e.g., handhelds) track the position one or more of the hands of the user during operation.

Figure 2:
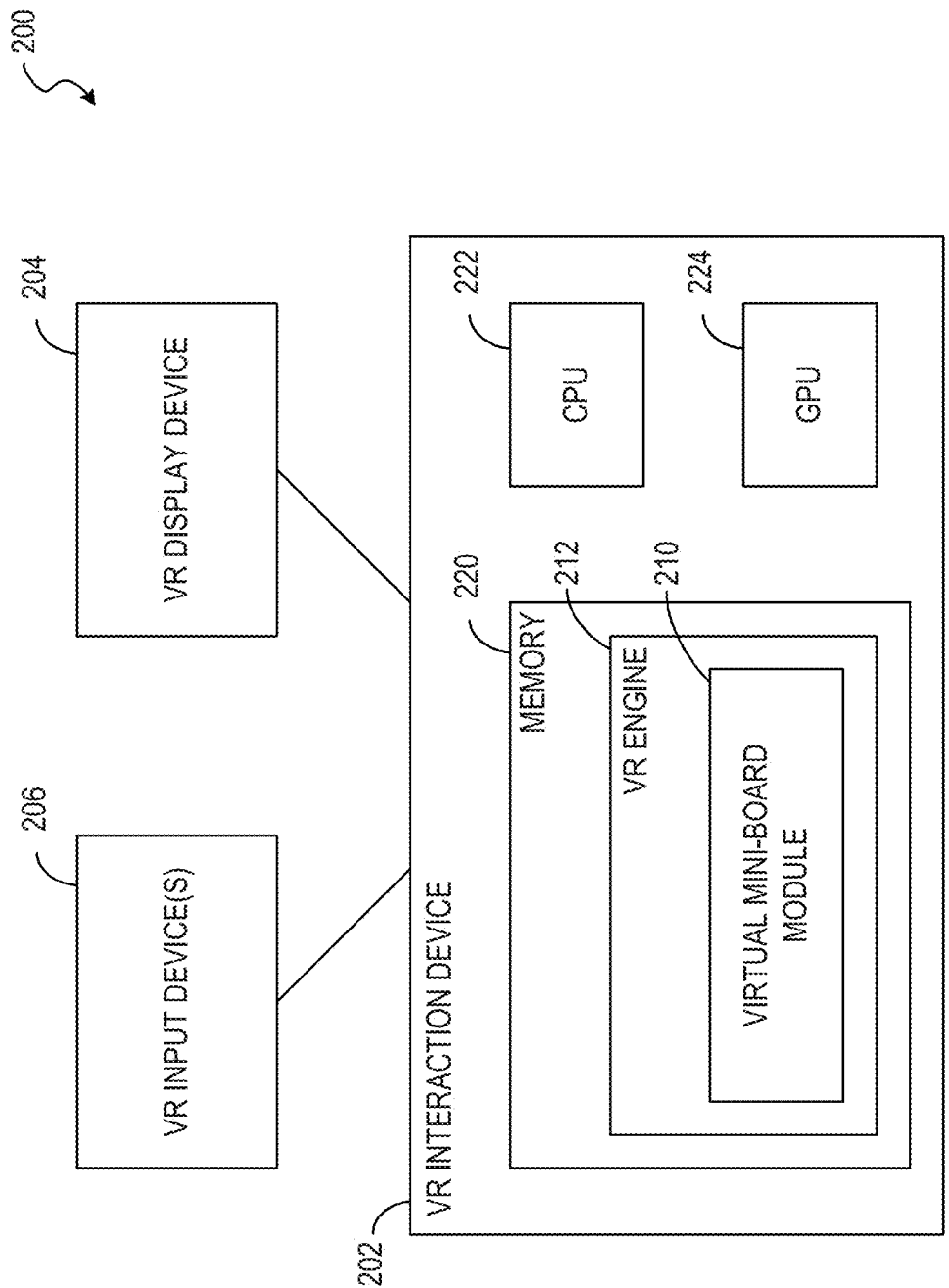
FIG. 2 is a component diagram of an example virtual mini-board system that includes components similar to the HMD shown in FIG. 1.

FIG. 2 is a component diagram of an example virtual mini-board system 200 that includes components similar to the HMD 102 shown in FIG. 1. The virtual mini-board system 200 includes a VR interaction device 202, a VR display device 204, and one or more VR input devices 206. In some embodiments, the VR display device 204 may be similar to the visor 108, and the VR input device(s) 206 may be similar to the handhelds or other tracking devices described above in reference to FIG. 1. In the example embodiment, the VR interaction device 202 includes a memory 220, one or more CPUs 222, and one or more GPUs 224. In some embodiments, the CPU 222 may be similar to the CPU 104, the GPU 224 may be similar to the GPU 106, and the VR interaction device 202 may be a part of the HMD 102.

In the example embodiment, the VR interaction device 202 includes a VR engine 212 (e.g., a game engine), executed by the CPU 222 or GPU 224, that provides a virtual environment through the VR display device 204 (e.g., to the user 100). The VR engine 212 includes a virtual mini-board module 210 implemented within, or otherwise in communication with, the VR engine 212. In some embodiments, the virtual environment provided by the VR engine 212 or the virtual mini-board module 210 may be a virtual world associated with a computer game. For example, a developer may utilize the virtual environment for in-world creation and editing of a virtual world during game development.

The virtual mini-board module 210 and the VR engine 212 include computer-executable instructions residing in the memory 220 that are executed by the CPU 222 or the GPU 224 during operation. The VR engine 212 communicates with the VR display device 204 (e.g., the HMD 102) and also with other VR hardware such as the VR input device(s) 206 (e.g., motion capture devices such as the handhelds). The virtual mini-board module 210 may be integrated directly within the VR engine 212, or may be implemented as an external piece of software (e.g., a plugin).

In some embodiments, the virtual mini-board module 210 and the various associated hardware and software components described herein may provide AR content instead of, or in addition to, VR content. It should be understood that the systems and methods described herein may be performed with AR content and, as such, the scope of this disclosure covers both AR and VR applications. Further, while many of the examples provided herein describe the user 100 operating within a virtual environment as a developer (e.g., editing the virtual world for later presentation to a player via a gaming engine), it should be understood that the virtual environment so constructed may later be presented to players via a conventional 2D/3D display.

Figure 3A:
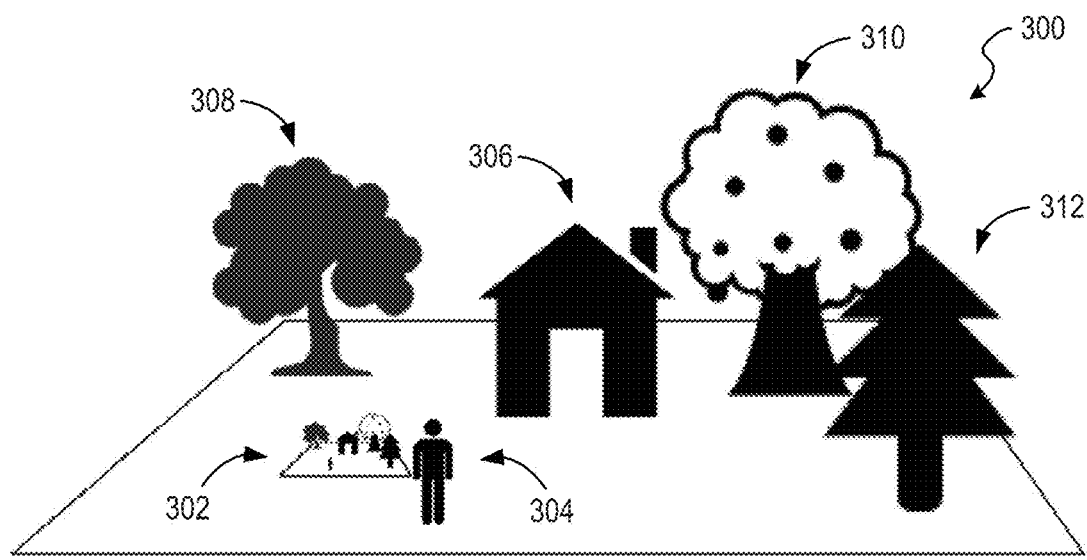
FIGS. 3A and 3B illustrate views of a virtual environment, including a virtual mini-board ("mini-board") provided to the user by the virtual mini-board module.
Figure 3B:
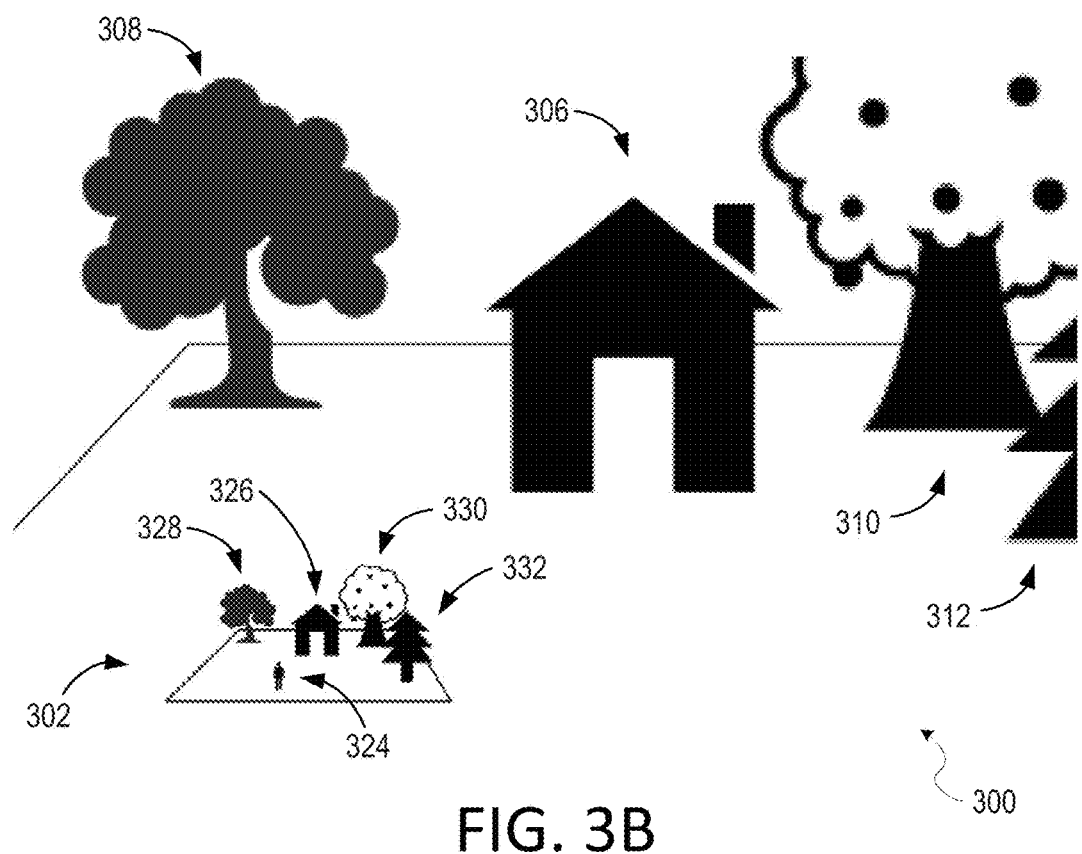

FIGS. 3A and 3B illustrate views of a virtual environment 300, including a virtual mini-board ("mini-board") 302 provided to the user 100 by the virtual mini-board module 210. FIG. 3A is a third-person perspective view of the virtual environment 300. FIG. 3B is a first-person perspective view of the virtual environment 300 as seen by the user 100 while immersed in the virtual environment 300. The user 100 may be, for example, a game developer in the process of creating or editing the virtual environment 300 for use in a computer game. In some embodiments, the virtual environment 300 may be viewed by the user 100 from one particular viewing perspective, and the mini-board 302 may present another perspective (e.g., from closer, from farther away, from a different angle, of a different region).

Referring now to FIGS. 3A and 3B, in the example embodiment, the user 100 wears the HMD 102 and experiences the virtual environment 100 via VR. The virtual environment is populated by multiple objects currently visible to the user 100, including a trees 308, 310, and 312, and a house 306. In the third person perspective view of FIG. 3A, an avatar 304 is also shown, along with the mini-board 302 hovering next to the avatar 304. The avatar 304 represents the user 100 within the virtual environment 300. In FIG. 3B, the avatar 304 is not shown, as the perspective is first-person. In some embodiments (e.g., in first-person perspective), the user 100 may see virtual representations of their hand(s) or arm(s) (not shown) as mirroring the real hands or arms of the user 100 (e.g., provided via motion tracking). Such visualizations may assist the user 100 interact with virtual objects within the virtual environment 300, or mini-objects on the mini-board 302, or with various menus or other active objects.

In the example embodiment, the mini-board 302 is an active, miniature representation (e.g., scaled) of a region of the virtual environment 300. The mini-board 302 displays active, miniature 3D objects ("mini-objects") representative of the larger objects within the user's surrounding virtual environment. In other words, each object within the region of the virtual environment 300 has a corresponding mini-object appearing on the mini-board 302. For example, a mini-avatar 324 is related to the original avatar 304, a mini-house 326 is related to the original house 306, a mini-tree 328 is related to the original tree 308, a mini-tree 330 is related to the original tree 310, and a mini-tree 332 is related to the original tree 312. For ease of description, objects appearing in the virtual environment 300 may be referred to herein as "original" objects, and objects appearing on the mini-board 302 may be referred to herein as "mini" objects. The mini-objects are said to be active in that they may be interacted with by the user 100.

In other embodiments, the mini-board 302 may be generated as a scaled transformation of the virtual environment 300, re-rendered on the mini-board 302. For example, the virtual mini-board module 210 may utilize two cameras, a viewer camera (or "main camera," e.g., providing the primary view of the virtual environment 300 to the user 100), and a "mini-board camera" (e.g., providing the view of the virtual environment 300 presented on the mini-board 302). In some embodiments, the mini-board camera may be located (or appear to be located, e.g., via a modified MVP matrix) at a different location than the viewer camera, thereby providing a different perspective of the virtual environment 300 (e.g., a camera zoomed out, or more distant from the viewer camera). In some embodiments, the virtual mini-board module 210 may perform a reference transform on the virtual environment 300 to generate the mini-board 302, thereby providing a different perspective from the perspective experienced by the user 100. The virtual mini-board module 210 may then render the virtual environment 300 from the position of the second camera and onto the mini-board 302. The virtual mini-board module 210 may pan the perspective, or scale the size of the objects appearing on the mini-board 302 (e.g., zooming), and may crop the view provided from the second camera position, thereby providing the region of the virtual environment 300 presented on the mini-board 302. Since, in this embodiment, the mini-board 302 is a re-rendered view of the virtual environment 300 itself, each object within the region of the virtual environment 300 appears as a smaller or larger version of itself on the mini-board 302. As such, each location on the mini-board 302 maps to a location in the virtual environment 300, and thus the virtual mini-board module 210 may allow operations via the mini-board 302 just as if performed on the objects directly in the virtual environment 300.

For example, in one embodiment, the virtual mini-board module 210 may provide the mini-board camera at the same location as the viewer camera, and may draw objects within the virtual environment 300, or even objects outside of the frustum view of the camera, onto the mini-board 302 using matrix math. The VR engine 212 may provide a Model-View-Projection (MVP) matrix used to transform a model of the virtual environment 300 into screen space. This may be a 4×4 matrix which, when combined with a position vertex, moves that vertex to the location on-screen where it is drawn by a viewer camera. The MVP matrix includes model information (e.g., which puts the vertex where it needs to be in the virtual environment 300), view information (e.g., which puts the vertex in camera space, where the viewer camera is at the origin looking along the Z axis), and perspective information (e.g., which applies a skew based on distance from camera to draw distant objects at a smaller size). This transformation math may be performed on every vertex of every object being drawn (e.g., by a "vertex shader"). The VR engine 212 may provide the MVP matrix using a "worldToCameraMatrix" property on the viewer camera object. This rendering is the user's 100 primary view of the virtual environment 300, and may include rendering a base of the mini-board 302 into the user's 100 view. For example, the base of the mini-board 302 may be an object like other objects within the virtual environment 300).

The virtual mini-board module 210 then renders the mini-board 302 using the MVP matrix of the vimini-board camera, transforming the larger virtual environment 300 to the location of the mini-board 302 and scaling the mini-board view to fit the size of the mini-board 302 base. In other words, the virtual mini-board module 210 transforms the virtual environment 300 based on a reference object, using a transformation matrix to move and scale the virtual environment such that it is smaller, and fits onto the mini-board 302, clipping the view to fit.

More specifically, and for example, for rendering the mini-board 302, the virtual mini-board module 210 uses the viewer camera's MVP matrix and transforms that MVP matrix by another matrix, miniToReferenceMatrix. The resulting camera matrix may be computed as:

miniToReferenceMatrix=miniboardTransform.localToWorldMatrix* referenceTransform.worldToLocalMatrix;

m_MiniCamera.worldToCameraMatrix=m_MainCamera.worldTo CameraMatrix*miniWorld.miniToReferenceMatrix;

Consider what happens to a single point in this transformation (e.g., 1, 1, 1). In this case, the transformation works backward from referenceTransform.worldToLocalmatrix. The example point is first transformed into the reference's local space, meaning that it is translated and scaled by the inverse of the reference translation and scale. For example, where referenceTransform has some scale >1.0, the point is reduced in magnitude. The mini-board translation and scale are then applied, thereby moving this reduced size object to have its origin at the mini-board position. In this way, as the reference scales up, the objects within are scaled down, but the representation of the scene stays the same size. Then, this the whole transformation to the main camera's VP matrix is applied, which allows rendering this shrunken, repositioned version of the world from the user's 100 perspective. This allows the user 100 to freely "look around" at the mini-board, keeping the Z-buffer data consistent between the two views such that it does not need to be cleared. In other words, the Z-buffer is shared between the viewer camera and the mini-board camera, and is used to determine which pixel (e.g., from the view of the viewer camera or from the view of the mini-board camera) makes it into the final image presented to the user 100. The sharking of the Z-buffer allows for the proper final rendering of objects that intersect with the mini-board 302 (e.g., with respect to compositing two rendered images). As such, this second camera is "tricked" into thinking the objects it is drawing are smaller and at a different position by modifying the MVP matrix given to the vertex shader.

In addition to rendering, a custom clip shader may be used to limit the mini-board 302 to particular boundaries (e.g., as identified by the region). To use the shader for rendering, the virtual mini-board module 210 calls RenderWithShader on the second camera associated with the mini-board 302 (e.g., which may be disabled, thereby preventing it from rendering "normally"). The shader includes the following:

float3 diff=abs(IN.worldPos-_GlobalClipCenter);
if (diff.x>_GlobalClipExtents.x||diff.y>_
  GlobalClipExtents.y||diff.z>_GlobalClipExtents.z)
  discard;

where IN.worldPos is the world position of the particular pixel being drawn, and _GlobalClipCenter and _GlobalClipExtents are both properties set by the chessboard to represent the position of the reference transform and the size of the mini-board, respectively. In other words, if the world position, offset by the reference position, is outside of the extents, discard (e.g., do not draw) that pixel.

Figure 4A:
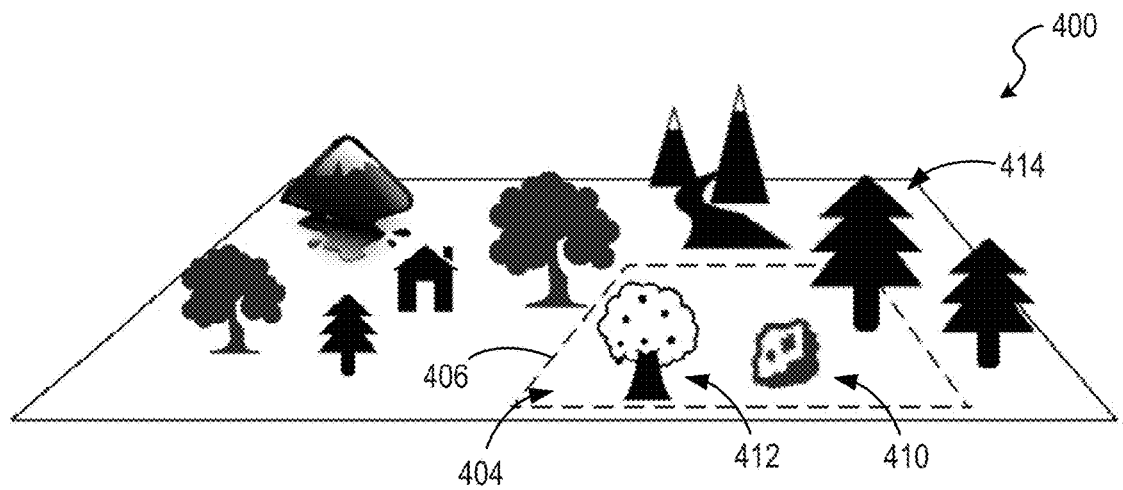
FIGS. 4A and 4B illustrate an example region of a virtual environment used by the virtual mini-board module to create a mini-board.
Figure 4B:
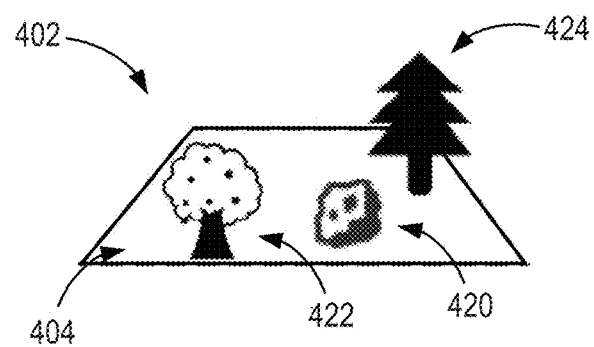

FIGS. 4A and 4B illustrate an example region 404 of a virtual environment 400 used by the virtual mini-board module 210 to create a mini-board 402. In some embodiments, the environment 400 may be similar to the environment 300, and the mini-board 402 may be similar to the mini-board 302. In the example embodiment, a boundary 406 of the region 404 within the larger virtual environment 400 defines the objects which appear on the mini-board 402 (e.g., as mini-objects). For example, objects within the region 404 include a boulder 410, and trees 412, 414. As such, the mini-map includes a mini-boulder 420 associated with a boulder 410, a mini-tree 422 associated with the tree 412, and another mini-tree 424 associated with the tree 414.

In the example embodiment, the region 404 is rectangular in shape. In other embodiments, the region 404 may be circular in shape. In still other embodiments, the region may be hexagonal, trapezoidal, or elliptical in shape. In some embodiments, the region 404 may be defined based on the location of the avatar 304 of the user 100. For example, the region 404 may be defined with the avatar 302 as the center of the rectangular region 404, or as the center of a circular or elliptical region. In the example embodiment, the region 404 is not based upon the location of the avatar 302 of the user 100. In other words, the region 404 is detached or otherwise not reliant upon where the avatar 302 currently is within the virtual environment 400. In some embodiments, the region 404 may be defined based on the orientation of the avatar 302 of the user 100. For example, the region 404 may be defined as a region in front of the user (e.g., such as a field of view).

In some embodiments, the boundary 406 of the region 404 may be identified to the user 100 within the virtual environment 400. In the example embodiment, and as shown in FIG. 4A, the region 404 is displayed to the user 100 in the virtual environment 400 as a broken line bordering the region 404. In some embodiments, the border 406 may be displayed to the user 100 as glowing. This allows the user 100 to visualize the region 404 currently active on the mini-board 402, and may allow certain interactions with the region, as described below.

In some embodiments, the region 404 may be adjustable by the user 100. For example, in some embodiments, the region 404 may be resized (e.g., expanded, shrunk). Changing the boundary of the region makes the mini-board 402 larger or smaller within the virtual environment 400, and reveals more or less of the virtual environment 400 on the mini-board 402 while the relative size of the objects remains the same. In some embodiments, the region 404 may be scaled. Scaling also reveals more or less of the virtual environment 400 on the mini-board 402, but also changes the relative size of the objects appearing on the mini-board 402 while keeping the mini-board 402 the same size within the virtual environment 400.

In some embodiments, the user 100 may move the region 404 while moving an object. For example, the user 100 may pick up an object on the mini-board 302, such as the mini-boulder 420, and may attempt to move the mini-boulder 420 off an edge of the mini-board 302. At such an event, the virtual mini-board module 210 may scroll the region 404 in the direction desired by the user 100 (e.g., as indicated by the edge on which they push the mini-object). The region 404 may move until the user 100 ceases pushing the mini-object off that edge. As such, the user 100 may move an object to a place not initially visible on the mini-board 302. Similarly, in some embodiments, the user 100 may move the region 404 via another gesture performed on the mini-board (e.g., without moving an object). For example, the virtual mini-board module 210 may provide a touch and drag gesture that allows the user 100 to touch the ground on the mini-board 302 and drag across to an edge. Like the object movement example above, the region 404 of the mini-board 302 may scroll in the direction of the edge until the user 100 ceases the touch and drag gesture. In some embodiments, the virtual mini-board module 210 may allow the user 100 to move the region 404 by selecting the border 406 (e.g., with a hand or other VR grasping tool) and moving the region 404 (e.g., translation, rotation). FIGS. 5A-5C illustrate the user 100 moving the focus of the mini-board 402 from the first region 404 to a second region 504 within the virtual environment 400.

FIG. 5A illustrates the virtual environment 400 with both the first region 404 and the second region 504 outlined with the border 406. While the border 406 is illustrated in FIG. 5A in two different locations, it should be understood that this is shown as such for purposes of illustration and, in the example embodiment, the border 406 would only be displayed at a single location, or may be shown "in motion" as the user 100 moves the focus of the mini-board 402 from the first region 404 to the second region 504. In the example embodiment, the user 100 selects (e.g., grabs) the border 406 and moves (e.g., drags) the focus of the mini-board 402 from the first region 404 to the second region 504, and unselects (e.g., releases, drops) the border 406 at the second region 504. FIG. 5B illustrates the mini-board 402 when the focus is on the first region 404 (e.g., before the move). Here, for example, the mini-board 402 includes the mini-boulder 420 and the mini-trees 422, 424. FIG. 5C illustrates the mini-board 402 when the focus is on the second region 504 (e.g., after the move). Here, for example, the mini-board 402 includes a mini-house 510, a mini-mountain 512, and a mini-tree 514, each of which are associated with counterpart objects in the region 504 of the virtual environment 400.

In the example embodiment, the virtual mini-board module 210 automatically updates the mini-board 402 as the user 100 moves the focus of the mini-board 402 from the first region 404 to the second region 504. In other words, as the focus moves, the virtual mini-board module 210 may remove mini-objects as they leave the focus of the mini-board 402, and may add mini-objects as they enter the focus of the mini-board 402. For example, the virtual mini-board module 210 may receive an updated position of the border 406 many times a second as the user initiates and performs the grab and move action. At each iteration, the virtual mini-board module 210 may compare the current focus of the mini-board 402 to a previous focus of the mini-board 402 and update the mini-board 402 to reflect the current area defined by the border 406. Such an update may require adding mini-objects to the mini-board 402 (e.g., if they now fall within the border 406), or removing mini-objects from the mini-board 402 (e.g., if they now fall outside of the border 406). As such, the user 100 may use this feature to determine when to "drop" the focus of the mini-board 402 (e.g., as they search for a particular region or object of interest), thereby providing added benefit to the user 100. Moving the region associated with the mini-map 402 may provide convenience benefits (e.g., simpler series of motions to perform a task), time saving benefits (e.g., fewer motions to perform a task), and artistic benefits to the user 100 during use (e.g., multiple simultaneous views of the virtual environment).

In the example embodiment, the mini-objects on the mini-boards 302, 402 represent the larger objects with which they are associated. The objects within the mini-boards 302, 402 may also be interacted with (e.g., selected, moved, edited, and so forth). More specifically, the virtual mini-board module 210 provides various interaction operations associated with the mini-board 302, 402 or the mini-objects on the mini-boards 302, 402. In some embodiments, the mini-objects may be interacted with in the same way as the corresponding large objects in the virtual environment 300, 400.

Figure 6A:
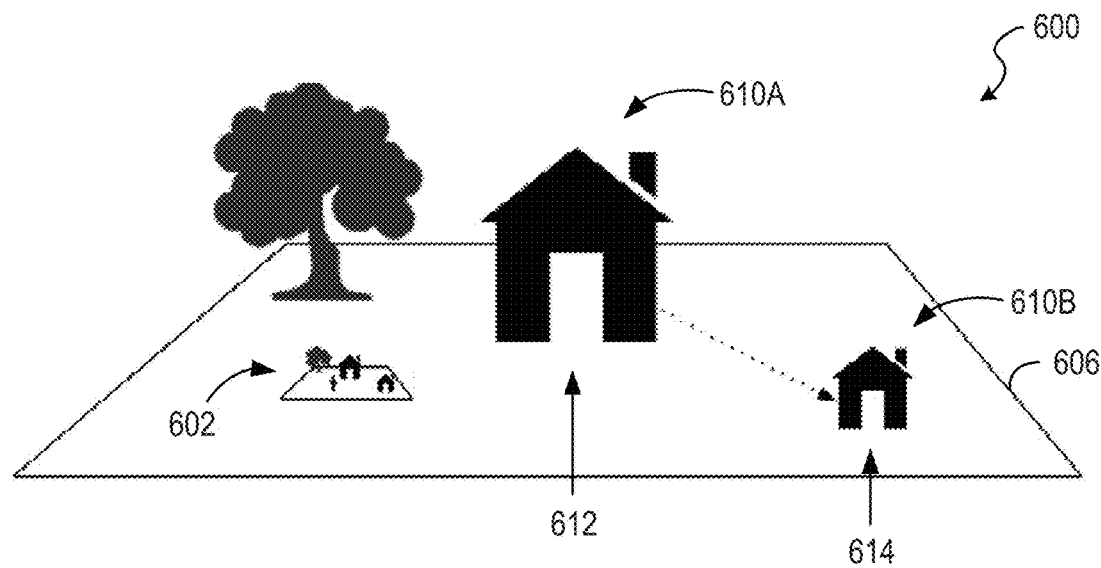
FIGS. 6A and 6B illustrate example interaction operations in which the user moves and resizes a house object (or just "house") within a virtual environment using a mini-board.
Figure 6B:
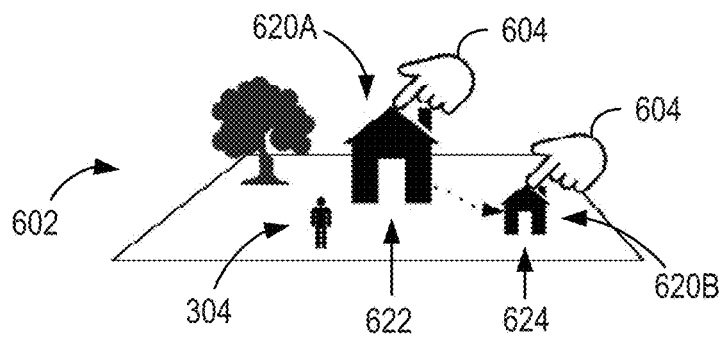

FIGS. 6A and 6B illustrate example interaction operations in which the user 100 moves and resizes a house object (or just "house") 610 within a virtual environment 600 using a mini-board 602. In some embodiments, the virtual environment 600 may be similar to the virtual environments 300, 400, and the mini-board 602 may be similar to the mini-boards 302, 402. FIG. 6A illustrates the example virtual environment 600 in first person perspective via VR (e.g., similar to FIG. 3B), with the mini-board 602 hovering to the left side of the field of view of the user 100. The mini-board 602 is within arm's reach of the user 100 (e.g., in VR) such that the user 100 may perform some types of interaction operations by interacting directly with the mini-board. FIG. 6B illustrates a close-up view of the mini-board 602, along with several mini-objects associated with objects appearing in the virtual environment 600, as would be seen by the user 100 within the first person perspective VR view of the virtual environment 600.

Referring now to FIGS. 6A and 6B, in the example embodiment, the user 100 performs a move interaction operation and a resize interaction operation using the mini-board 602. The VR virtual environment provided to the user 100 includes a virtual representation of the user's 100 hand (or "hand icon") 604, with which the user 100 engages the mini-board 602 and the various mini-objects thereon. While the hand icon 604 is shown only in FIG. 6B in this example, it should be understood that the hand icon 100 appears to the use 100 in the virtual environment 600 along with the mini-board 602, which is shown in the close-up view of FIG. 6B for purposes of illustration.

During the example interaction operations, the user 100 moves the house 604 from a first location 612 to a second location 614 within the virtual world 600. More specifically, the user 100 performs this move interaction operation via interactions with the mini-board. The mini-board includes a mini-house object (or just "mini-house") 620. The mini-house 620, initially, is a larger-sized mini-house 620A at a first location 622 on the mini-board. The mini-house 620 is associated with the house 610, which appears in the virtual environment 600 at a first location 610. During the move operation, the user 100 selects (e.g., grabs using a VR grasping tool) the mini-house 620 and moves (e.g., drags) the mini-house 620 from the first location 622 to a second location 624 on the mini-board 602 and deselects (e.g., releases) the mini-house 620 at the second location 624. In response, the virtual mini-board module 210 moves the house 610 in the virtual environment 600 from the first location 612 to the second location 614. As such, the virtual environment 600 effectively mirrors the movement changes made on the mini-board 602.

During the movement operation, the virtual mini-board module 210 detects the movement of the mini-board object (e.g., the mini-house 620) and computes the movement of the associated object in the virtual environment 600 (e.g., the house 610) based on the location change of the mini-house 620 on the mini-board 602. In some embodiments, the virtual mini-board module 210 utilizes relative location determination to compute the second location 614 in the virtual environment 600 based on the position displacement on the mini-board 602. Since the mini-board 602 represents a particular region of the virtual environment 600, each location on the mini-board 602 has a corresponding location in the virtual environment 600.

In some embodiments, the virtual mini-board module 210 may alter the view experienced by the user 100 based on object movement on the mini-board 602. For example, presume the user 100 wishes to move the house 610 to a location outside of a current region 606 of the mini-board 602. In other words, the new location 624 for the mini-house 620 is outside of the region currently shown on the mini-board 602. To provide moving objects further distances, the virtual mini-board module 210 allows the user 100 to grab an object (e.g., the mini-house 620A) from the mini-board 602 and "push" the held object in any directional edge of the mini-board 602. Upon detecting this edge push, the virtual mini-board module 210 begins scrolling the region 606 covered by the mini-board 602 in the direction of the push. Once the user 100 ceases the edge push, the movement of the region 606 stops, and the user 100 may drop the mini-house 620 at the new location within the new region. In some embodiments, this method of region movement may only affect the objects shown on the mini-board 602. In other embodiments, this method of region movement may also change the view perspective of the user 100 (e.g., "re-focusing" on the region as it moves, or once the movement is complete). As such, this provides an additional, convenient way for the user 100 to use the mini-board 602 to move objects.

During the resize operation, the user 100 may resize an object on the mini-board (e.g., the mini-house 620) to resize the object in the virtual environment 600 (e.g., the house 610). In the example embodiment, though not mechanically depicted, the user 100 may select the mini-object for resizing (e.g., by menu selection, or pre-determined input operation on the mini-house 620) and may stretch or compress the mini-house 620 until the desired size is achieved. For example, selection of objects on the mini-board 602 may be performed by the user 100 by gazing at a particular object on the mini-board 602, or via voice commands (e.g., "select red house"), or by a pointer function, or via a hand action such as touching or grabbing. In some embodiments, the resize operation may be performed by selecting the mini-object and editing object parameters (e.g., via a pop-up menu), or by grabbing an edge of the mini-object and stretching the object.

Similarly, in some embodiments, the virtual mini-board module 210 may alter the mini-board 602 based on changes performed in the full virtual environment 600. For example, the user 100 may select the house 610 in the virtual environment 600 (e.g., not from the mini-board 602) and move the house 610 from the first location 612 to the second location 614. As such, the virtual mini-board module 210 may reflect the change on the mini-board 602 by moving the mini-house 620 from the first location 622 to the second location 624. Accordingly, the mini-board 602 maintains a consistent, mirrored image of the full virtual environment 600 within the focus of the mini-board 602.

The use of the mini-board 602 to perform interaction operations such as moving and resizing objects such as the house 610 may be made easier, more convenient, and faster by using the mini-board 602. For example, the user 100 may have performed similar operations (e.g., object movement or resizing) directly to the house 610 within the virtual environment by moving to the first location 612 within the virtual environment 600 (e.g., within arm's reach of interacting with the house 610A), grabbing the house 610A, then moving to the second location 612 and dropping the house 610A at the new location. However, this approach may require the user 100 to move, thereby incurring delays. Further, this approach may require a shift in viewing perspective, which may undermine the artistic process. In addition, some operations may require more significant gestures to effect the operation (e.g., wider or higher or longer reaching by the user 100), which can be a logistical challenge for some developers who work in more confined physical quarters. By using the mini-board 602, the user 100 removes unnecessary movement, thereby saving time, reduces the significance of the needed gesture to effectuate the operation, and also maintains their current perspective on the virtual environment 600.

Figure 7:
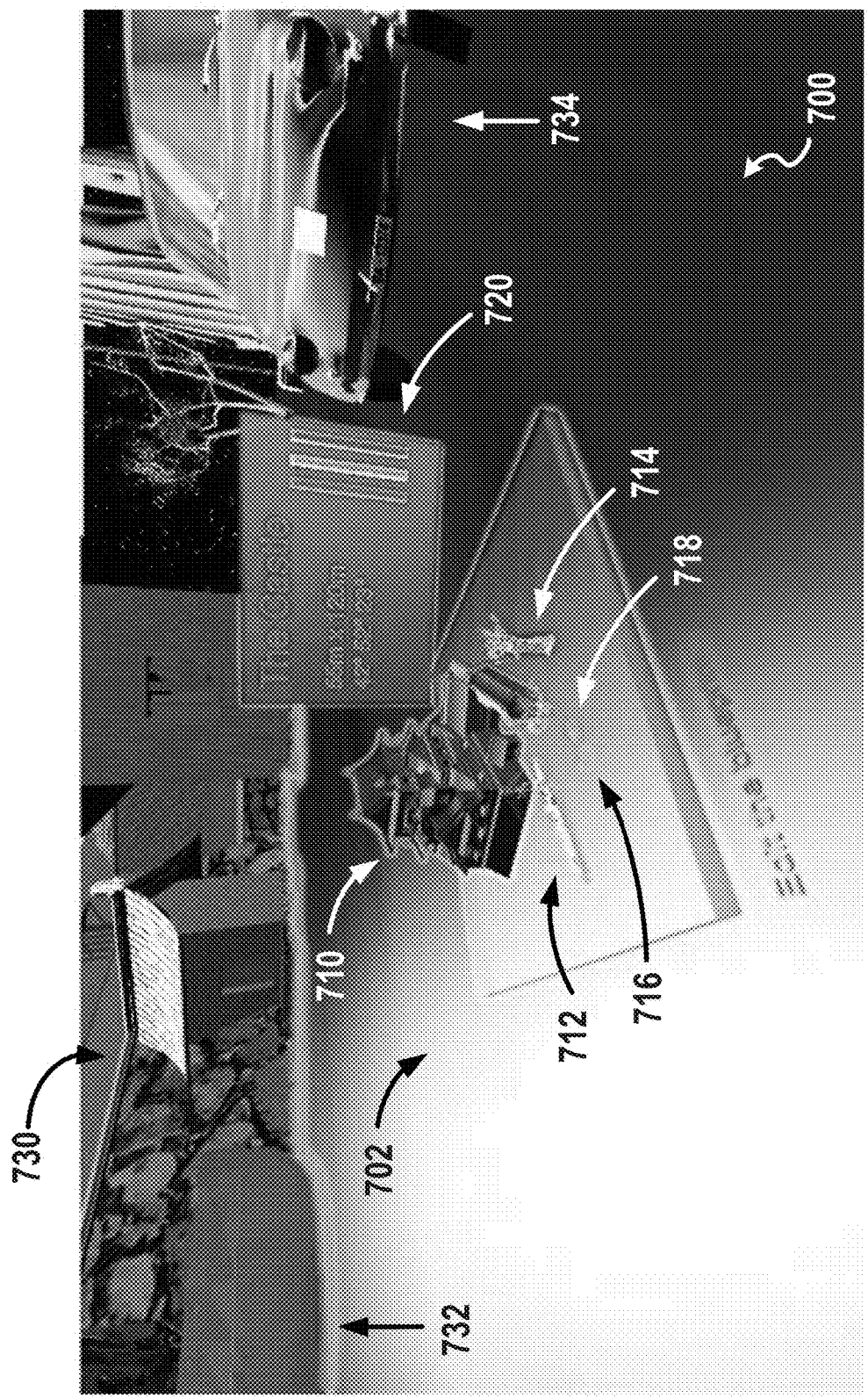
FIG. 7 is a fully rendered example virtual environment illustrating a selection operation performed by the user via a mini-board.

FIG. 7 is a fully rendered example virtual environment 700 illustrating a selection operation performed by the user 100 via a mini-board 702. In some embodiments, the virtual environment 700 may be similar to the virtual environments 300, 400, 600, and the mini-board 702 may be similar to the mini-boards 302, 402, 602. In the example embodiment, the mini-board 702 includes multiple mini-objects representative of objects in the virtual environment 700, including a mini-castle 710, a mini-vessel 712, a mini-statue 714, a mini-avatar 716 and a mini-car 718. Outside the mini-board 702, the user 100 views a perspective of the virtual environment 700, which in this example includes full-sized objects of a castle 730, a vessel 732, and a car 734 (only portions of which are visible in FIG. 7, based on the perspective of the user 100 in the virtual environment 700). The castle 730 is associated with the mini-castle 710, the vessel 732 is associated with the mini-vessel 712, and the car 734 is associated with the mini-car 718. The mini-avatar 716 on the mini-board 702 illustrates the relative position of the user 100 within the virtual environment 700.

In the example embodiments, the user 100 has selected the mini-castle 710 from the mini-board 702. In response to this selection, the virtual mini-board module 210 highlights the mini-castle 710 on the mini-board 702 (e.g., with a glowing purple halo around the mini-object), and additionally highlights the associated larger object (e.g., the castle 730) within the virtual environment 700. As such, the user 100 has an easier time identifying that a mini-object has been selected on the mini-board, which mini-object has been selected, and where the associated object is in the full virtual environment 700. In some embodiments, either or neither of the mini-object and the associated larger object may be highlighted.

In the example embodiment, upon selection of the mini-castle 710 on the mini-board 702, the virtual mini-board module 210 also displays an information panel 720 adjacent to the selected mini-object. The virtual mini-board module 210 populates the information panel 720 with certain information about the associated full sized object. In this example, selection of the mini-castle 710 causes the virtual mini-board module 210 to display information about the castle 730 object in the information panel 720, including a name of the object (e.g., "The Castle"), a size of the object (e.g., "55 m×120 m"), a location of the object (e.g., "42° 52′ 23′′′"). Such object information may differ (e.g., based on the type of object, or based on user preference, or pre-determined settings). Any such object information may be configured to appear in the information panel 720.

Such a selection operation allows the user 100 to easily select an object via the mini-board 702, perhaps even an object not immediately visible via the full virtual environment 700, and to view data about that object through the information panel 720 presented near the mini-board 702. This provides a convenient and efficient tool for the user 100 to interact with objects in the virtual environment 700.

Figure 8A:
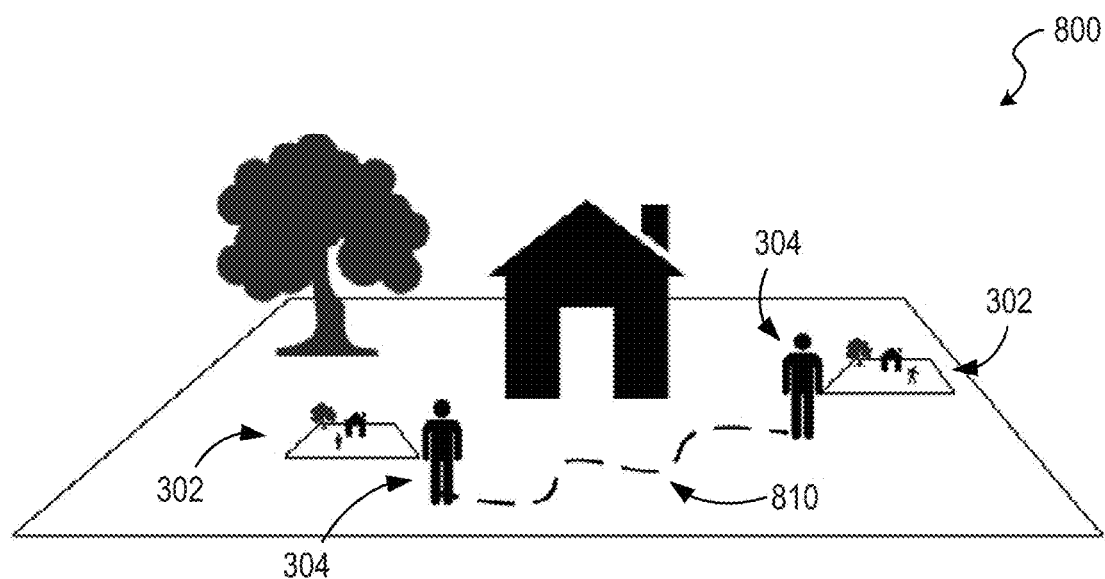
FIG. 8A illustrates a third-person perspective of the avatar moving along a path in the virtual environment.
Figure 8B:
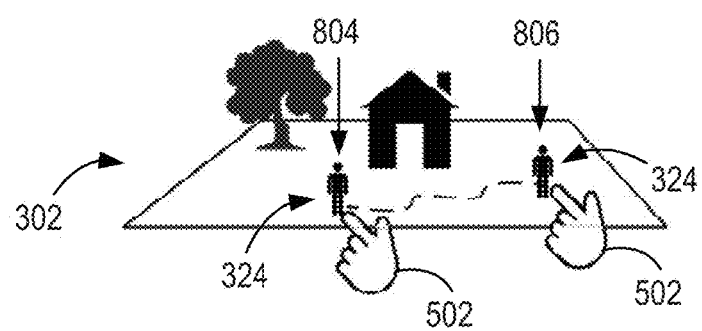
FIG. 8B illustrates avatar manipulation operations performed on the mini-board.

FIGS. 8A and 8B illustrate avatar movement within a virtual environment 800, and associated changes to a mini-board 802. FIG. 8A illustrates a third-person perspective of the avatar 304 moving along a path 810 in the virtual environment. In some situations, the user 100 may cause such movements in the virtual environment based on real world inputs, gestures, or movements (e.g., via VR motion tracking hardware or other input devices). For example, the user 100 may move through the virtual environment 800 (e.g., walking a path 810), with the mini-board 302 hovering near the avatar 304 (e.g., within arm's reach of the user 100). As the avatar 304 moves along the path, the user's 100 view of the virtual environment 800 is updated accordingly (e.g., based on the change of perspective based on the new position of the avatar 304). For ease of discussion, movement and orientation is discussed relative to the avatar 304 of the user 100 rather than to the user 100 themselves, as it is presumed that that the real world inputs from the user 100 are manifested in the movements of the avatar 304.

In some embodiments, the mini-board 302 may be attached to the avatar 304 of the user 100 and, as such, the virtual mini-board module 210 may track the movement of the user 100 within virtual environment, moving the focus of the mini-board 302 as the avatar 304 moves through the virtual environment 800. In the example embodiment, the focus of the mini-board 302 is fixed, and the virtual mini-board module 210 updates the position of the mini-avatar 324 on the mini-board 302 as the avatar 304 moves along the path 810 in the virtual environment 800.

FIG. 8B illustrates avatar manipulation operations performed on the mini-board 302. In the example embodiments, the user 100 may select, move, or edit the avatar 304 via the mini-board 302 (e.g., via the mini-avatar 324). In the example embodiment, the user 100 selects (e.g., grabs, using the hand icon 502) the mini-avatar 324 on the mini-board 302 and moves the mini-avatar 324 from a first location 804 to a second location 806. The user 100 drops the mini-avatar 324 at the second location 806 to complete the move. In some embodiments, the user's 100 view of the virtual environment 800 is calculated and updated as the user 100 moves the mini-avatar 324 (e.g., while the mini-avatar 324 is still held by the grab operation, based on the current position of the mini-avatar 324 as it is being moved around the mini-board 302). In other embodiments, the user's 100 view of the virtual environment 800 is calculated and updated when the user 100 drops the mini-avatar 324 (e.g., based on the position and orientation of the mini-avatar 324 at the second location 806).

In some embodiments, the mini-board 302 may be used to teleport the user 100 around the virtual environment 800. For example, the user 100 may select the mini-avatar 324 and then touching the desired destination (e.g., the second location 806) on the mini-board 302. In response, the virtual mini-board module 210 then moves the mini-avatar 324 to the second location 806 and updates the view of the virtual environment 800 for the user 100 (e.g., based on the new location and orientation of the mini-avatar 324).

Figure 9:
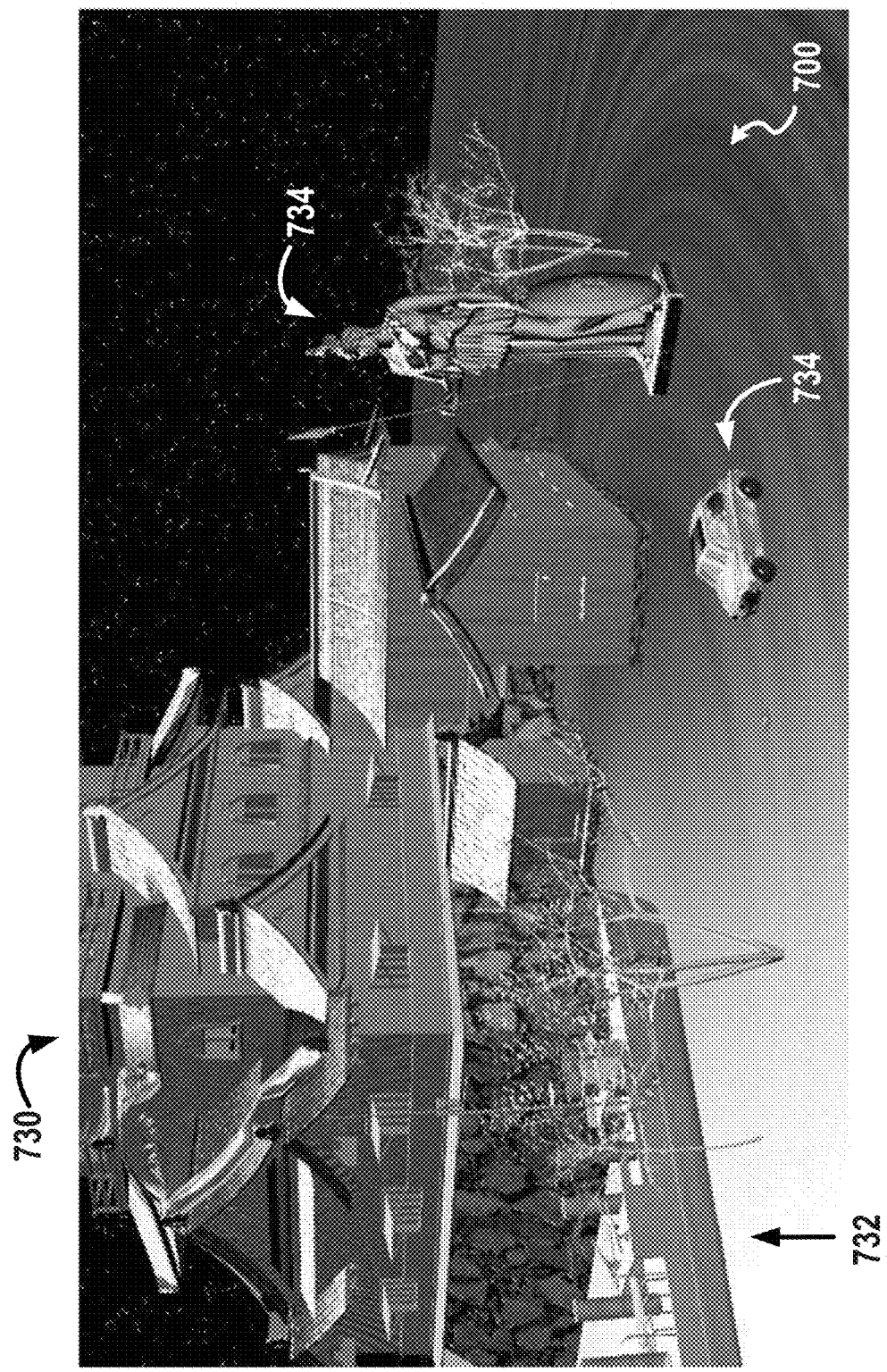
FIG. 9 illustrates a fully rendered example of the virtual environment presented to the user from a perspective floating above ground level.

FIG. 9 illustrates a fully rendered example of the virtual environment 700 presented to the user 100 from a perspective floating above ground level. This scene includes the castle 730, the vessel 732, the car 734, and a statue 910, among other objects. At the time of this scene, the user 100, the mini-board has not been activated yet.

Figure 10:
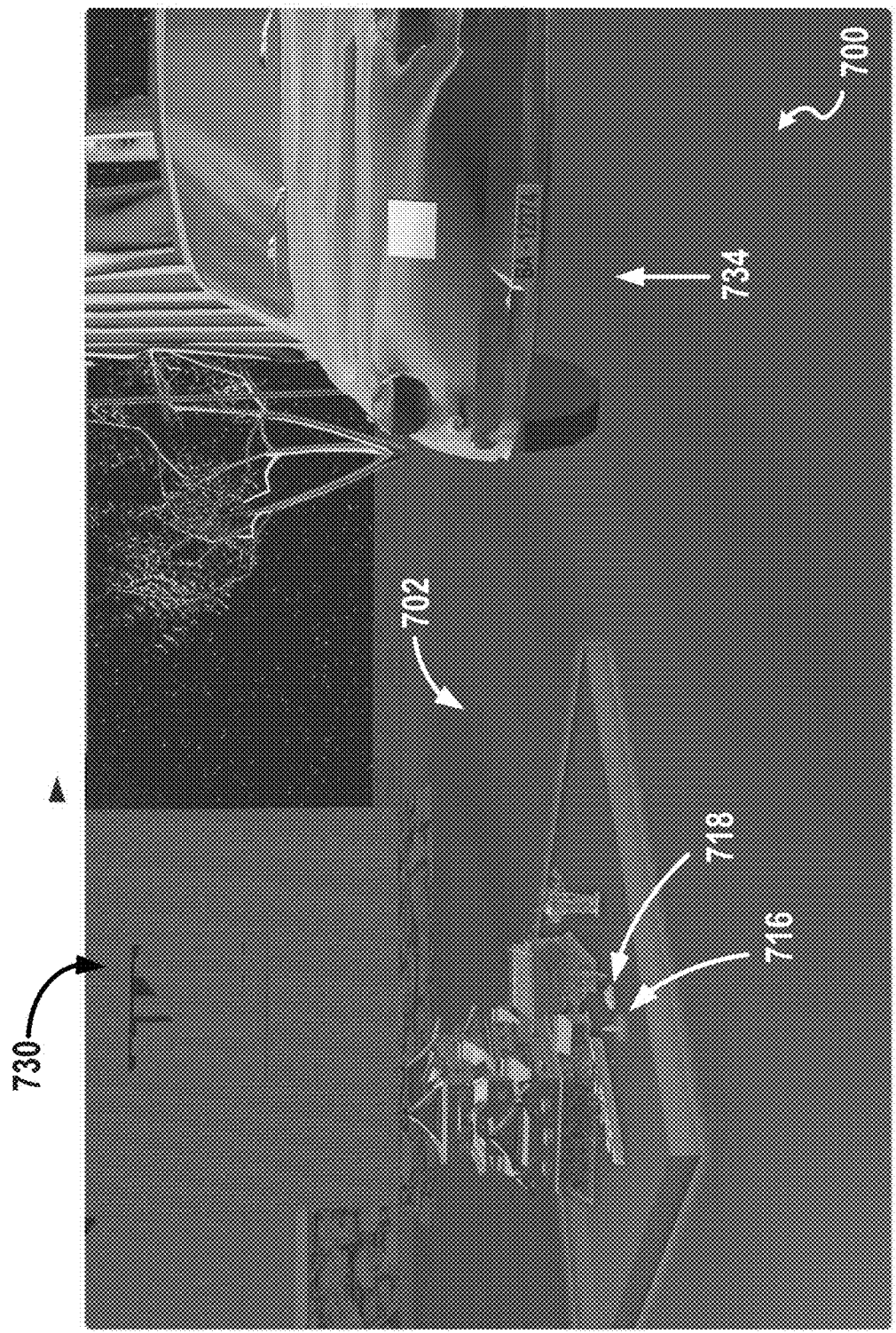
FIG. 10 illustrates the fully rendered example virtual environment in which the user activates the mini-board for use.

FIG. 10 illustrates the fully rendered example virtual environment 700 in which the user 100 activates the mini-board 702 for use. In some embodiments, the mini-board 702 may be toggled on and off (e.g., by the user as needed, or automatically based on certain events). In the example embodiment, the user 100 is at ground level next to the car 734 when they activate the mini-board 702. To activate the mini-board 702, the user 100 may perform a particular hand-based gesture, or a voice command, or activate a particular menu or menu object within the virtual environment 700. Once activated, the virtual mini-board module 210 displays the mini-board 702 for use by the user 100, and near the user 100 (e.g., within arm's reach in VR). In some embodiments, the mini-board floats alongside the user 100 as the user 100 moves through the virtual environment 700. In the example embodiment, the virtual mini-board module 210 displays the mini-avatar 716, highlighted in glowing purple, next to the mini-car 718 and, further, highlights the mini-avatar 716 (e.g., in a particular color, or by changing brightness, with a glowing effect, or with a ground halo) to alert the user 100 of their current location with respect to other objects within the larger environment 700.

Figure 11:
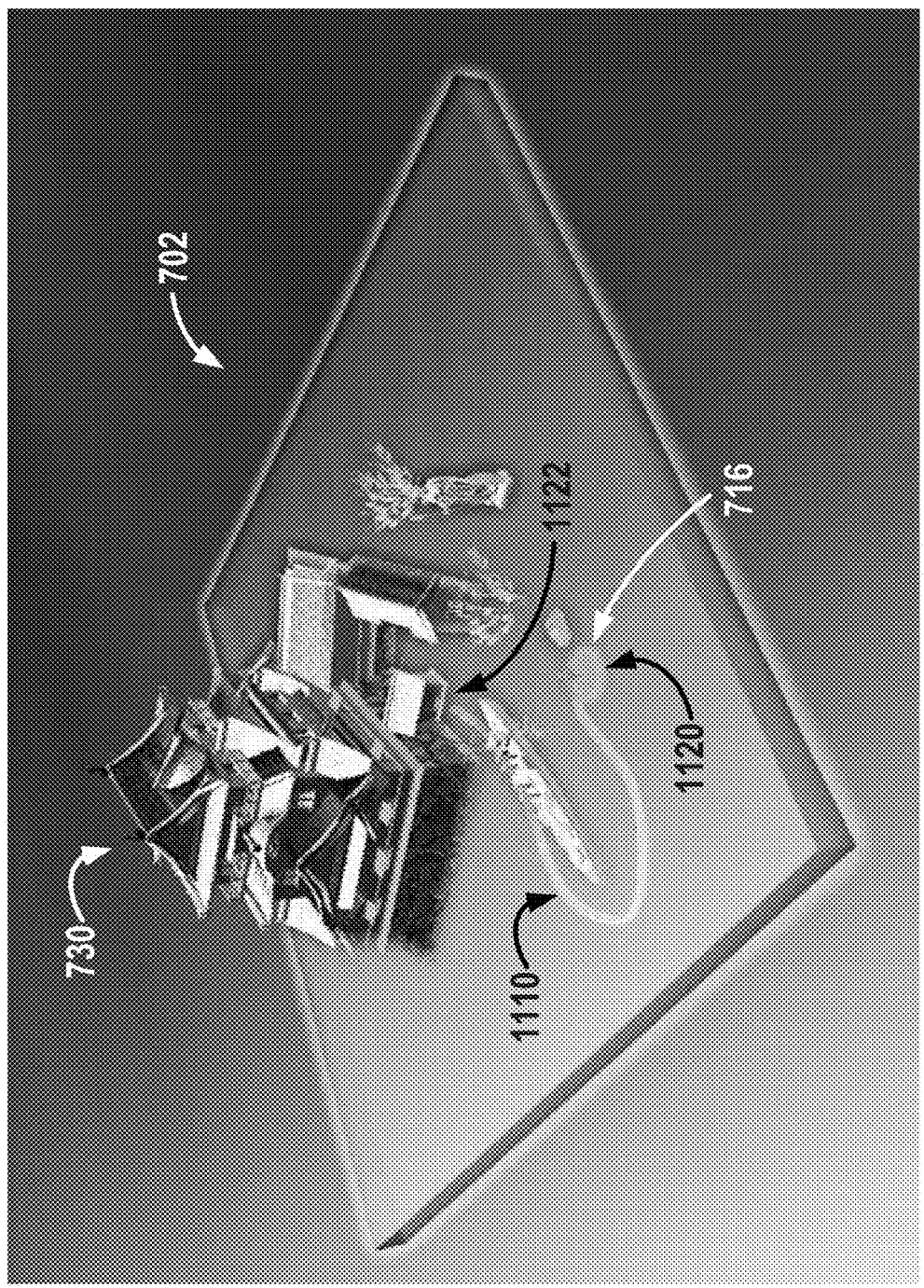
FIG. 11 illustrates a "flight" operation initiated by the user via the mini-board to move around the virtual environment.

FIG. 11 illustrates a "flight" operation initiated by the user 100 via the mini-board 702 to move around the virtual environment 700. In the example embodiment, the user selects the mini-avatar 716 and traces a flight path 1110 from a first location 1120 (e.g., the current location of the mini-avatar 716) to a second location 1122 (e.g., near a lower end of the castle 730. The mini-avatar 716 and flight path 1110 are highlighted in purple in FIG. 11. In response, the virtual mini-board module 210 then moves (e.g., "flys") the user 100 through the virtual environment 700 along the flight path 1110 at a predetermined speed, allowing the user 100 to view the virtual environment 700 as they move along the path 1110. In the example shown in FIG. 11A, the flight path 1110 is along the ground. In some embodiments, the flight path 1110 may be elevated above the ground (e.g., through the air, in 3D space). Further, in embodiments where the mini-board 702 is attached to the user 100, the mini-board 702 may move along with the user 100 through the flight path 1110. The user 100 may control aspects of the flight operation, such as speed, camera perspective/orientation along the path, path change during flight, pausing, fast forwarding along the path, rewinding, or returning to the point of origin.

In some embodiments, the virtual mini-board module 210 may enable object creation operations via the mini-board 702. For example, the user 100 may add objects into the virtual environment 700 by placing new objects onto the mini-board 702. The virtual mini-board module 210 may provide other workspace tools that allow the developer to select objects to add to the virtual environment 700 during the development process. These tools may allow the developer to select an object of interest (e.g., from a card tray, from a menu) and drag and drop the object into the virtual environment 700, thereby causing a new instance of the object to be added into the virtual environment 700 at the drop point. The virtual mini-board module 210 may allow the user 100 to add such objects via the mini-board 702 by dragging and dropping the object onto the mini-board 702. As such, the virtual mini-board module 210 uses the drop location on the mini-board 702 to determine a corresponding location within the virtual environment 700, and then adds the new object at that corresponding location.

In some embodiments, the virtual mini-board module 210 may enable object deletion operations via the mini-board 702. For example, the user may delete objects from the virtual environment by selecting objects from the mini-board and performing a deletion action (e.g., selecting deletion from a menu, moving the object from the mini-board to a virtual trashcan, taking the object from the mini-board and throwing it "offscreen").

In some embodiments, the virtual mini-board module 210 may operate in conjunction with other workspace tools provided within the virtual environment. For example, the VR engine 212 may provide an object inspector workspace that provides various functionality regarding object properties, allowing the user 100 to view or change properties of a selected object. To enable cooperative functionality, the virtual mini-board module 210 may allow the user 100 to select objects from the mini-board 702, which may then cause the object inspector workspace to focus on that selected object (e.g., showing details of that object, allowing that object's properties to be updated, and so forth). This allows the mini-board 702 to support functionality provided by other workspace tools, thereby enhancing the usefulness of the mini-board 702.

Figure 12:
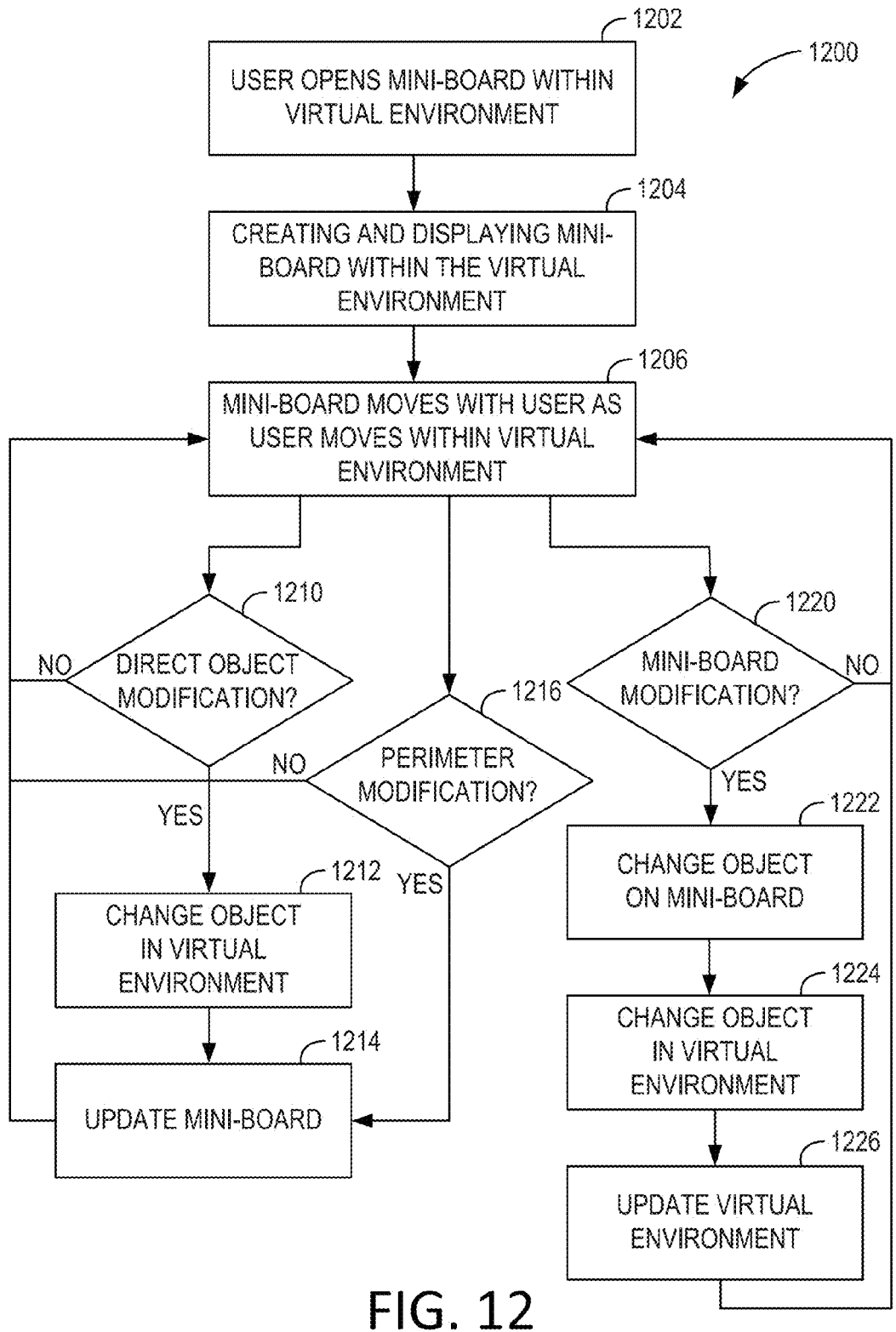
FIG. 12 illustrates an example method for providing mini-boards within virtual environments.

FIG. 12 illustrates an example method 1200 for providing mini-boards within virtual environments. At operation 1202, the user 100 opens the virtual mini-board within a VR environment and, at operation 1204, the virtual mini-board module 210 creates and displays the mini-board within the VR environment. The mini-board represents a scaled down version of the VR world (or a subset of the world). As the user 100 moves through the VR environment, the mini-board follows the user 100 through the VR world at operation 1206. If, at conditional 1216, the user modifies the perimeter of the mini-board (e.g., for example by dragging the perimeter around or changing the perimeter size and shape), then the VR engine 212 may communicate any necessary data to the virtual mini-board module 210, causing an update to the display on the virtual mini-board (see operation 1214). The user 100 may also directly change the large scale VR environment by moving or otherwise modifying an object directly (e.g., moving or resizing a tree, without use of the mini-board) (see test 1210 and operation 1212). As such, the VR engine 212 may communicate any data related to said changes to the virtual mini-board, thereby causing an update to the display on the virtual mini-board (see operation 1214). The user 100 may also modify an object via the virtual mini-board (see test 1220), thereby causing changes on the mini-board and in the larger VR environment (see operation 1222. 1224). If the user modifies an object on the virtual mini-board, then the virtual mini-board module 210 communicate any data related to said changes to the VR engine 212, thereby causing an update to the display of the large VR environment (see operation 1226).

Figure 13:
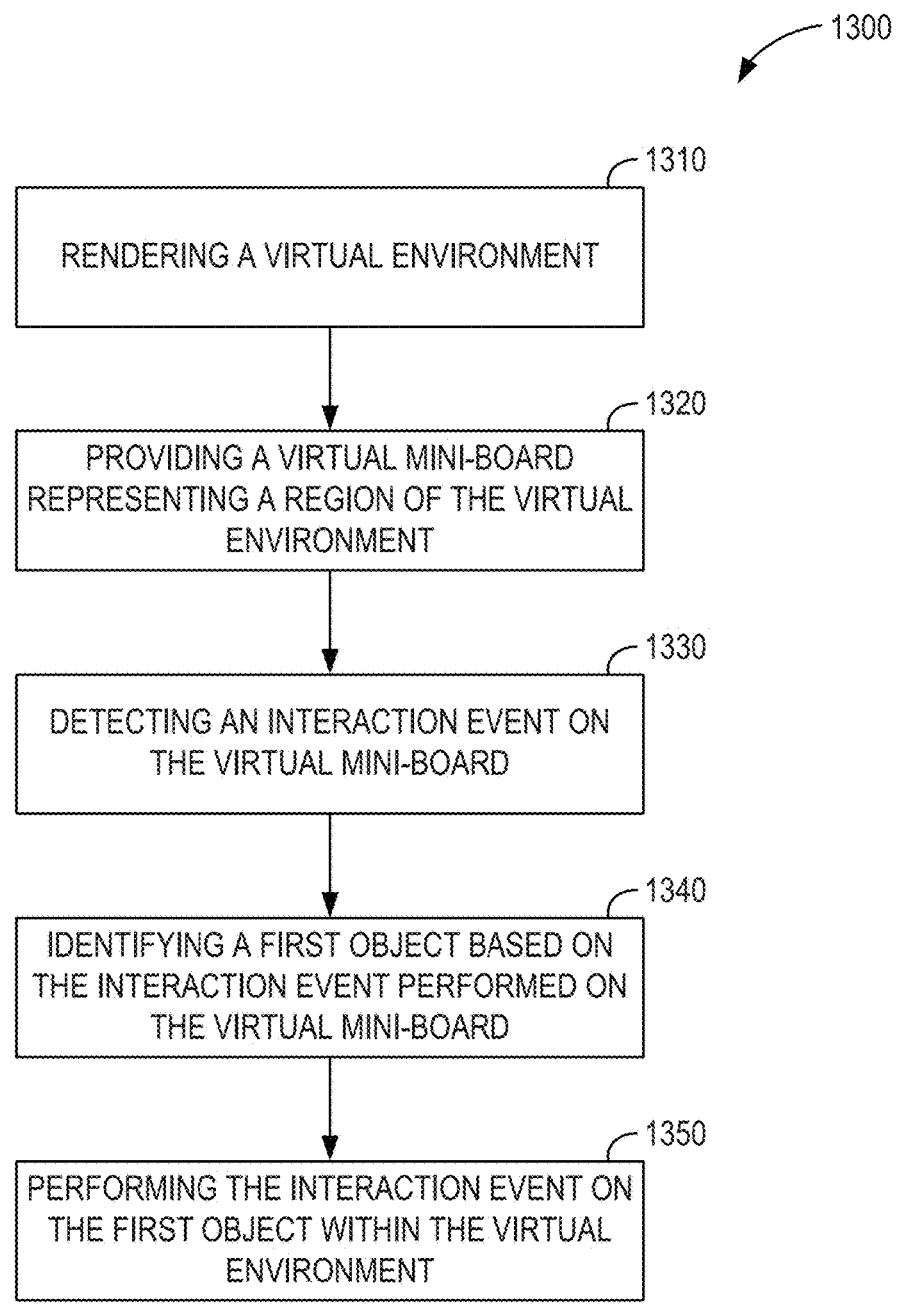
FIG. 13 illustrates an example computer-implemented method for providing a virtual mini-board within a virtual environment.

FIG. 13 illustrates an example computer-implemented method 1300 for providing a virtual mini-board within a virtual environment. The computer-implemented method 1300, hereafter referred to as "the method 1300," is performed by a computing device comprising at least one hardware processor and a memory. In the example embodiment, the method 1300 includes rendering a virtual environment for presentation to the user via a head mounted display (HMD) worn by the user, the virtual environment being rendered from a first perspective that provides a field of view of the virtual environment to the user (see operation 1310).

The method 1300 also includes providing a virtual mini-board to the user within the field of view, the virtual mini-board representing a region of the virtual environment (see operation 1320). In some embodiments, providing the virtual mini-board to the user within the field of view further includes orienting the virtual mini-board within a pre-determined length of a location of the user within the virtual environment. In some embodiments, providing the virtual mini-board to the user within the field of view further includes moving the virtual mini-board relative to movement of the user within the virtual environment. In some embodiments, providing the virtual mini-board further includes rendering the virtual environment onto the virtual mini-board based on a camera position from a second perspective different than the first perspective. In some embodiments, providing the virtual mini-board further includes identifying a first object appearing within the region of the virtual environment, creating a first mini-object associated with the first object, and displaying the first mini-object on the virtual mini-board at a position on the virtual mini-board based on a position of the first object within the region of the virtual environment.

In the example embodiment, the method 1300 further includes detecting an interaction event performed by the user on the virtual mini-board, the input device is configured to allow the user to interact with virtual objects presented in the virtual environment, the interaction event being performed by the user using the input device (see operation 1330). In some embodiments, the input device includes a hand tracking device operated by a first hand of the user, and detecting the interaction event includes receiving a grab event involving an object appearing on the virtual mini-board.

The method 1300 also includes identifying the first object based on the interaction event performed on the virtual mini-board (see operation 1340). The method 1300 further includes performing the interaction event on the first object within the virtual environment based on the interaction event performed on the virtual mini-board (see operation 1350). In some embodiments, the method 1300 further includes receiving a scroll operation associated with the region, the scroll operation is initiated by the user scrolling to an edge of the virtual mini-board, moving the region within the virtual environment in a direction of the edge identified by the scroll operation, and re-rendering the field of view of the virtual environment based on said moving.

The examples of how to use a virtual mini board are shown to illustrate the systems and methods described herein, and associated benefits. Such examples of use should not be construed to be limitations on the logical process embodiments, nor should variations of user interface methods from those described herein be considered outside the scope of the present disclosure.

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

The modules, methods, applications and so forth described in conjunction with FIGS. 1-13 are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the systems and methods described herein in different contexts from this disclosure.

Figure 14:
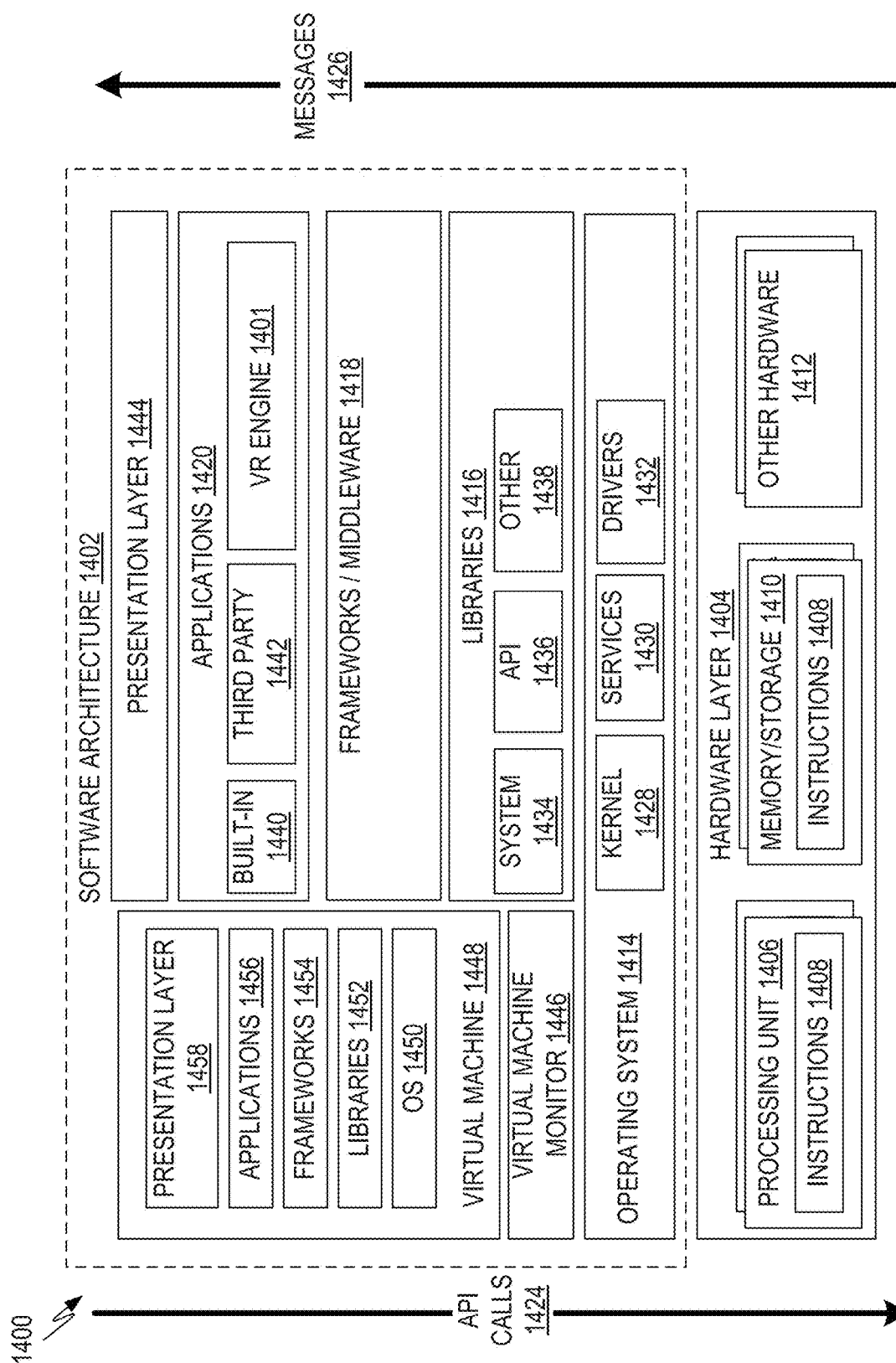
FIG. 14 is a block diagram illustrating a representative software architecture, which may be used in conjunction with various hardware architectures described herein to provide the VR tools and development environment described herein.

FIG. 14 is a block diagram 1400 illustrating a representative software architecture 1402, which may be used in conjunction with various hardware architectures described herein to provide the VR tools and development environment described herein. FIG. 14 is merely a non-limiting example of a software architecture and it will be appreciated that many other architectures may be implemented to facilitate the functionality described herein. The software architecture 1402 may be executing on hardware such as machine 1500 of FIG. 15 that includes, among other things, processors 1510, memory 1530, and I/O components 1550. A representative hardware layer 1404 is illustrated and can represent, for example, the machine 1500 of FIG. 15. The representative hardware layer 1404 comprises one or more processing units 1406 having associated executable instructions 1408. Executable instructions 1408 represent the executable instructions of the software architecture 1402, including implementation of the methods, modules and so forth of FIGS. 1-11. Hardware layer 1404 also includes memory or storage modules 1410, which also have executable instructions 1408. Hardware layer 1404 may also comprise other hardware as indicated by 1412 which represents any other hardware of the hardware layer 1404, such as the other hardware illustrated as part of machine 1500.

In the example architecture of FIG. 14, the software 1402 may be conceptualized as a stack of layers where each layer provides particular functionality. For example, the software 1402 may include layers such as an operating system 1414, libraries 1416, frameworks/middleware 1418, applications 1420 and presentation layer 1422. Operationally, the applications 1420 or other components within the layers may invoke application programming interface (API) calls 1424 through the software stack and receive a response, returned values, and so forth illustrated as messages 1426 in response to the API calls 1424. The layers illustrated are representative in nature and not all software architectures have all layers. For example, some mobile or special purpose operating systems may not provide a frameworks/middleware layer 1418, while others may provide such a layer. Other software architectures may include additional or different layers.

The operating system 1414 may manage hardware resources and provide common services. The operating system 1414 may include, for example, a kernel 1428, services 1430, and drivers 1432. The kernel 1428 may act as an abstraction layer between the hardware and the other software layers. For example, the kernel 1428 may be responsible for memory management, processor management (e.g., scheduling), component management, networking, security settings, and so on. The services 1430 may provide other common services for the other software layers. The drivers 1432 may be responsible for controlling or interfacing with the underlying hardware. For instance, the drivers 1432 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1416 may provide a common infrastructure that may be utilized by the applications 1420 or other components or layers. The libraries 1416 typically provide functionality that allows other software modules to perform tasks in an easier fashion than to interface directly with the underlying operating system 1414 functionality (e.g., kernel 1428, services 1430 or drivers 1432). The libraries 1416 may include system 1434 libraries (e.g., C standard library) that may provide functions such as memory allocation functions, string manipulation functions, mathematic functions, and the like. In addition, the libraries 1416 may include API libraries 1436 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1416 may also include a wide variety of other libraries 1438 to provide many other APIs to the applications 1420 and other software components/modules.

The frameworks 1418 (also sometimes referred to as middleware) may provide a higher-level common infrastructure that may be utilized by the applications 1420 or other software components/modules. For example, the frameworks 1418 may provide various graphic user interface (GUI) functions, high-level resource management, high-level location services, and so forth. The frameworks 1418 may provide a broad spectrum of other APIs that may be utilized by the applications 1420 or other software components/modules, some of which may be specific to a particular operating system or platform.

The applications 1420 includes built-in applications 1440 or third party applications 1442. Examples of representative built-in applications 1440 may include, but are not limited to, a contacts application, a browser application, a book reader application, a location application, a media application, a messaging application, a VR engine 1401, or a game application. Third party applications 1442 may include any of the built in applications as well as a broad assortment of other applications. In a specific example, the third party application 1442 (e.g., an application developed using the Android™ or iOS™ software development kit (SDK) by an entity other than the vendor of the particular platform) may be mobile software running on a mobile operating system such as iOS™, Android™ Windows® Phone, or other mobile operating systems. In this example, the third party application 1442 may invoke the API calls 1424 provided by the mobile operating system such as operating system 1414 to facilitate functionality described herein.

The applications 1420 may utilize built in operating system functions (e.g., kernel 1428, services 1430 or drivers 1432), libraries (e.g., system 1434, APIs 1436, and other libraries 1438), frameworks/middleware 1418 to create user interfaces to interact with users of the system. Alternatively, or additionally, in some systems interactions with a user may occur through a presentation layer, such as presentation layer 1444. In these systems, the application/module "logic" can be separated from the aspects of the application/module that interact with a user.

Some software architectures utilize virtual machines. In the example of FIG. 14, this is illustrated by virtual machine 1448. A virtual machine creates a software environment where applications/modules can execute as if they were executing on a hardware machine (such as the machine of FIG. 15, for example). A virtual machine is hosted by a host operating system (operating system 1414 in FIG. 14) and typically, although not always, has a virtual machine monitor 1446, which manages the operation of the virtual machine as well as the interface with the host operating system (i.e., operating system 1414). A software architecture executes within the virtual machine such as an operating system 1450, libraries 1452, frameworks/middleware 1454, applications 1456 or presentation layer 1458. These layers of software architecture executing within the virtual machine 1448 can be the same as corresponding layers previously described or may be different.

In the example embodiment, the VR engine 1401 operates as an application in the applications 1420 layer. However, in some embodiments, the VR engine 1401 may operate in other software layers, or in multiple software layers (e.g., framework 1418 and application 1420), or in any architecture that enables the systems and methods as described herein. The VR engine 1401 may be similar to the VR engine 212.

Figure 15:
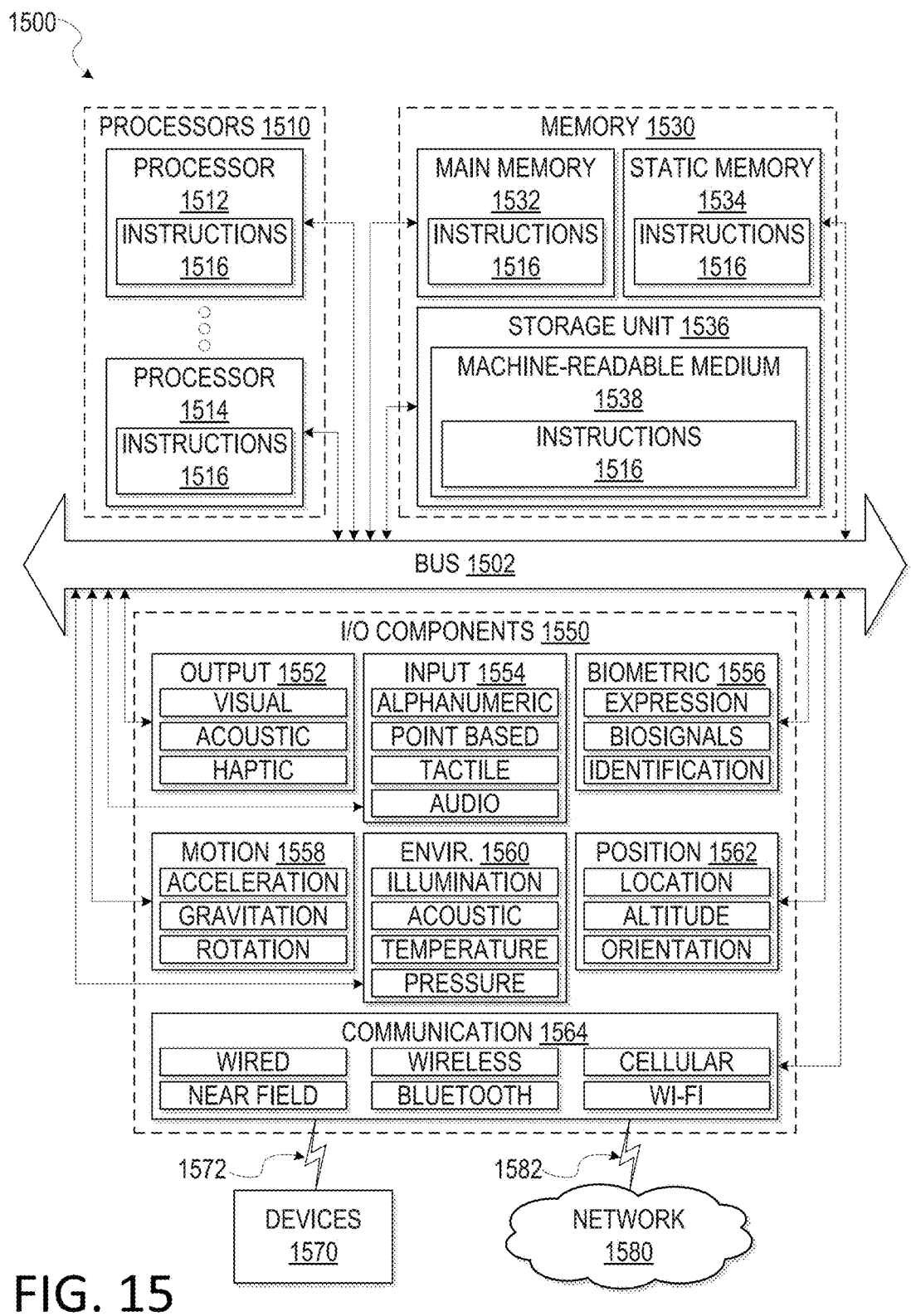
FIG. 15 is a block diagram illustrating components of a machine, according to some example embodiments, able to read instructions from a machine-readable medium (e.g., a machine-readable storage medium) and perform any one or more of the VR methodologies discussed herein.

FIG. 15 is a block diagram illustrating components of a machine 1500, according to some example embodiments, able to read instructions from a machine-readable medium 1338 (e.g., a machine-readable storage medium) and perform any one or more of the VR methodologies discussed herein. Specifically, FIG. 15 shows a diagrammatic representation of the machine 1500 in the example form of a computer system, within which instructions 1516 (e.g., software, a program, an application, an applet, an app, or other executable code) for causing the machine 1500 to perform any one or more of the methodologies discussed herein may be executed. For example the instructions may cause the machine to execute the flow diagrams of FIGS. 12-13. The instructions transform the general, non-programmed machine into a particular machine programmed to carry out the described and illustrated functions in the manner described. In alternative embodiments, the machine 1500 operates as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1516, sequentially or otherwise, that specify actions to be taken by machine 1500. Further, while only a single machine 1500 is illustrated, the term "machine" shall also be taken to include a collection of machines 1500 that individually or jointly execute the instructions 1516 to perform any one or more of the methodologies discussed herein.

The machine 1500 may include processors 1510, memory 1530, and I/O components 1550, which may be configured to communicate with each other such as via a bus 1502. In an example embodiment, the processors 1510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1512 and processor 1514 that may execute instructions 1516. The term "processor" is intended to include multi-core processor that may comprise two or more independent processors (sometimes referred to as "cores") that may execute instructions contemporaneously. Although FIG. 15 shows multiple processors, the machine 1500 may include a single processor with a single core, a single processor with multiple cores (e.g., a multi-core process), multiple processors with a single core, multiple processors with multiples cores, or any combination thereof.

The memory/storage 1530 may include a memory 1532, such as a main memory, or other memory storage, and a storage unit 1536, both accessible to the processors 1510 such as via the bus 1502. The storage unit 1536 and memory 1532 store the instructions 1516 embodying any one or more of the methodologies or functions described herein. The instructions 1516 may also reside, completely or partially, within the memory 1532, within the storage unit 1536, within at least one of the processors 1510 (e.g., within the processor's cache memory), or any suitable combination thereof, during execution thereof by the machine 1500. Accordingly, the memory 1532, the storage unit 1536, and the memory of processors 1510 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store instructions 1516. The term "machine-readable medium" shall also be taken to include any medium, or combination of multiple media, that is capable of storing instructions (e.g., instructions 1516) for execution by a machine (e.g., machine 1500), such that the instructions, when executed by one or more processors of the machine 1500 (e.g., processors 1510), cause the machine 1500 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes transitory signals per se.

The I/O components 1550 may include a wide variety of components to receive input, provide output, produce output, transmit information, exchange information, capture measurements, and so on. The specific I/O components 1550 that are included in a particular machine will depend on the type of machine. For example, portable machines such as mobile phones will likely include a touch input device or other such input mechanisms, while a headless server machine will likely not include such a touch input device. It will be appreciated that the I/O components 1550 may include many other components that are not shown in FIG. 15. The I/O components 1550 are grouped according to functionality merely for simplifying the following discussion and the grouping is in no way limiting. In various example embodiments, the I/O components 1550 may include output components 1552 and input components 1554. The output components 1552 may include visual components (e.g., displays such as a plasma display panel (PDP), a light emitting diode (LED) display, a liquid crystal display (LCD), a projector, a cathode ray tube (CRT), or wearable devices such as head-mounted display (HMD) devices), acoustic components (e.g., speakers), haptic components (e.g., a vibratory motor, resistance mechanisms), other signal generators, and so forth. The input components 1554 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location or force of touches or touch gestures, or other tactile input components), motion-sensing input components (e.g., hand controllers), audio input components (e.g., a microphone), and the like.

In further example embodiments, the I/O components 1550 may include biometric components 1556, motion components 1558, environmental components 1560, or position components 1562 among a wide array of other components. For example, the biometric components 1556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1558 may include acceleration sensor components (e.g., accelerometer), gravitation sensor components, rotation sensor components (e.g., gyroscope), position-sensing components, and so forth. The environmental components 1560 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1562 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1550 may include communication components 1564 operable to couple the machine 1500 to a network 1580 or devices 1570 via coupling 1582 and coupling 1572 respectively. For example, the communication components 1564 may include a network interface component or other suitable device to interface with the network 1580. In further examples, communication components 1564 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1570 may be another machine or any of a wide variety of peripheral devices (e.g., a peripheral device coupled via a Universal Serial Bus (USB)).

In various example embodiments, one or more portions of the network 1580 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1580 or a portion of the network 1580 may include a wireless or cellular network and the coupling 1582 may be a Code Division Multiple Access (CDMA) connection, a Global System for Mobile communications (GSM) connection, or other type of cellular or wireless coupling. In this example, the coupling 1582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1516 may be transmitted or received over the network 1580 using a transmission medium via a network interface device (e.g., a network interface component included in the communication components 1564) and utilizing any one of a number of well-known transfer protocols (e.g., hypertext transfer protocol (HTTP)). Similarly, the instructions 1516 may be transmitted or received using a transmission medium via the coupling 1572 (e.g., a peer-to-peer coupling) to devices 1570. The term "transmission medium" shall be taken to include any intangible medium that is capable of storing, encoding, or carrying instructions 1516 for execution by the machine 1500, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A system comprising:
   one or more hardware processors;
   a head mounted display (HMD) configured to display a virtual environment to a user wearing the HMD;
   an input device configured to allow the user to interact with virtual objects presented in the virtual environment; and
   a virtual mini-board module, executable by the one or more hardware processors, configured to perform operations comprising:
      rendering the virtual environment for presentation to the user via the HMD, the virtual environment being rendered from a first perspective that provides a field of view of the virtual environment to the user;
      providing a virtual mini-board to the user within the field of view, the virtual mini-board including one or more virtual mini-objects representing one or more virtual objects presented within a region of the virtual environment, the virtual mini-board is configured to remain located relative to the user within the virtual environment as the user moves within the virtual environment;
      detecting an interaction event performed on a first virtual mini-object of the one or more virtual mini-objects by the user on the virtual mini-board, the interaction event being performed by the user using the input device;
      identifying a first virtual object of the one or more virtual objects within the virtual environment based on the first virtual mini-object identified by the interaction event performed on the virtual mini-board; and
      performing the interaction event on the first object within the virtual environment based on the interaction event performed on the virtual mini-board.

2. The system of claim 1, wherein providing the virtual mini-board to the user within the field of view further includes orienting the virtual mini-board within a predetermined length of a location of the user within the virtual environment.

3. The system of claim 2, wherein providing the virtual mini-board to the user within the field of view further includes moving the virtual mini-board relative to movement of the user within the virtual environment.

4. The system of claim 1, wherein the input device includes a hand tracking device operated by a first hand of the user, wherein receiving the interaction event includes receiving a grab event involving an object appearing on the virtual mini-board.

5. The system of claim 1, wherein providing the virtual mini-board further includes rendering the virtual environment onto the virtual mini-board based on a camera position from a second perspective different than the first perspective.

6. The system of claim 1, wherein providing the virtual mini-board further includes:
   identifying a first object appearing within the region of the virtual environment;
   creating a first mini-object associated with the first object; and
   displaying the first mini-object on the virtual mini-board at a position on the virtual mini-board based on a position of the first object within the region of the virtual environment.

7. The system of claim 1, wherein the virtual mini-board module is further configured to perform operations comprising:
   receiving a scroll operation associated with the region, the scroll operation is initiated by the user scrolling to an edge of the virtual mini-board;
   moving the region within the virtual environment in a direction of the edge identified by the scroll operation; and
   re-rendering the field of view of the virtual environment based on said moving.

8. A computer-implemented method comprising:
   rendering a virtual environment for presentation to the user via a head mounted display (HMD) worn by the user, the virtual environment being rendered from a first perspective that provides a field of view of the virtual environment to the user;
   providing a virtual mini-board to the user within the field of view, the virtual mini-board including one or more mini-objects representing one or more virtual objects presented within a region of the virtual environment, the virtual mini-board is configured to remain located relative to the user within the virtual environment as the user moves within the virtual environment;
   detecting an interaction event performed on a first virtual mini-object of the one or more virtual mini-objects by the user on the virtual mini-board, the input device is configured to allow the user to interact with virtual objects presented in the virtual environment, the interaction event being performed by the user using the input device;
   identifying a first virtual object of the one or more virtual objects based on the first virtual mini-object identified by the interaction event performed on the virtual mini-board; and
   performing the interaction event on the first object within the virtual environment based on the interaction event performed on the virtual mini-board.

9. The method of claim 8, wherein providing the virtual mini-board to the user within the field of view further includes orienting the virtual mini-board within a predetermined length of a location of the user within the virtual environment.

10. The method of claim 9, wherein providing the virtual mini-board to the user within the field of view further includes moving the virtual mini-board relative to movement of the user within the virtual environment.

11. The method of claim 8, wherein the input device includes a hand tracking device operated by a first hand of the user, wherein receiving the interaction event includes receiving a grab event involving an object appearing on the virtual mini-board.

12. The method of claim 8, wherein providing the virtual mini-board further includes rendering the virtual environment onto the virtual mini-board based on a camera position from a second perspective different than the first perspective.

13. The method of claim 8, wherein providing the virtual mini-board further includes:
identifying a first object appearing within the region of the virtual environment;
creating a first mini-object associated with the first object; and
displaying the first mini-object on the virtual mini-board at a position on the virtual mini-board based on a position of the first object within the region of the virtual environment.

14. The method of claim 8, further comprising:
receiving a scroll operation associated with the region, the scroll operation is initiated by the user scrolling to an edge of the virtual mini-board;
moving the region within the virtual environment in a direction of the edge identified by the scroll operation; and
re-rendering the field of view of the virtual environment based on said moving.

15. A non-transitory machine-readable medium storing processor-executable instructions which, when executed by a processor, cause the processor to:
render a virtual environment for presentation to the user via a head mounted display (HMD) worn by the user, the virtual environment being rendered from a first perspective that provides a field of view of the virtual environment to the user;
provide a virtual mini-board to the user within the field of view, the virtual mini-board including one or more mini-objects representing one or more virtual objects presented within a region of the virtual environment, the virtual mini-board is configured to remain located relative to the user within the virtual environment as the user moves within the virtual environment;
detect an interaction event on a first virtual mini-object of the one or more virtual mini-objects performed by the user on the virtual mini-board, the input device is configured to allow the user to interact with virtual objects presented in the virtual environment, the interaction event being performed by the user using the input device;
identify a first virtual object of the one or more virtual objects based on the first virtual mini-object identified by the interaction event performed on the virtual mini-board; and
perform the interaction event on the first object within the virtual environment based on the interaction event performed on the virtual mini-board.

16. The machine-readable medium of claim 15, wherein providing the virtual mini-board to the user within the field of view further includes:
orienting the virtual mini-board within a pre-determined length of a location of the user within the virtual environment; and
moving the virtual mini-board relative to movement of the user within the virtual environment.

17. The machine-readable medium of claim 15, wherein the input device includes a hand tracking device operated by a first hand of the user, wherein receiving the interaction event includes receiving a grab event involving an object appearing on the virtual mini-board.

18. The machine-readable medium of claim 15, wherein providing the virtual mini-board further includes rendering the virtual environment onto the virtual mini-board based on a camera position from a second perspective different than the first perspective.

19. The machine-readable medium of claim 15, wherein providing the virtual mini-board further includes:
identifying a first object appearing within the region of the virtual environment;
creating a first mini-object associated with the first object; and
displaying the first mini-object on the virtual mini-board at a position on the virtual mini-board based on a position of the first object within the region of the virtual environment.

20. The machine-readable medium of claim 15, wherein the processor-executable instructions further cause the processor to:
receive a scroll operation associated with the region, the scroll operation is initiated by the user scrolling to an edge of the virtual mini-board;
move the region within the virtual environment in a direction of the edge identified by the scroll operation; and
re-render the field of view of the virtual environment based on said moving.

* * * * *